(12) United States Patent
Smith

(10) Patent No.: US 8,429,049 B2
(45) Date of Patent: Apr. 23, 2013

(54) METHOD AND SYSTEM FOR ALLOCATING COMPUTING RESOURCES

(75) Inventor: Philip S. Smith, Carmel, CA (US)

(73) Assignee: Galactic Computing Corporation BVI/IBC, Hong Kong (HK)

( * ) Notice: Subject to any disclaimer, the term of this patent is extended or adjusted under 35 U.S.C. 154(b) by 0 days.

(21) Appl. No.: 13/192,342

(22) Filed: Jul. 27, 2011

(65) Prior Publication Data

US 2012/0137004 A1    May 31, 2012

Related U.S. Application Data

(63) Continuation of application No. 12/957,026, filed on Nov. 30, 2010, which is a continuation of application No. 09/907,520, filed on Jul. 17, 2001, now Pat. No. 7,844,513, which is a continuation-in-part of application No. 09/710,095, filed on Nov. 10, 2000, now Pat. No. 6,816,905.

(60) Provisional application No. 60/218,602, filed on Jul. 17, 2000.

(51) Int. Cl.
*G06Q 40/00*    (2006.01)

(52) U.S. Cl.
USPC .............................................. 705/35; 705/39

(58) Field of Classification Search ............... 705/10–44
See application file for complete search history.

(56) References Cited

U.S. PATENT DOCUMENTS

| | | | |
|---|---|---|---|
| 3,764,747 A | 10/1973 | Nakajima et al. | |
| 4,502,116 A | 2/1985 | Fowler et al. | |
| 4,920,487 A | 4/1990 | Baffes | |
| 5,031,089 A | 7/1991 | Liu et al. | |
| 5,155,854 A | 10/1992 | Flynn et al. | |
| 5,187,710 A | 2/1993 | Chau et al. | |

(Continued)

FOREIGN PATENT DOCUMENTS

| | | |
|---|---|---|
| CA | 2415770 | 4/2010 |
| CN | ZL01812619.7 | 11/2006 |

(Continued)

OTHER PUBLICATIONS

Web site print-out: rackspace.com; 2 pgs.; Copyright 2000.

(Continued)

*Primary Examiner* — Frantzy Poinvil
(74) *Attorney, Agent, or Firm* — Patterson Thuente Pedersen, P.A.

(57) ABSTRACT

A method for operating a commissioned e-commerce service provider provides services to businesses on a computerized network such as the Internet in exchange for a small commission on the commercial transactions generated using those services. Unlike most ISPs that provide services to individuals and businesses, the commissioned e-commerce service provider preferably provides Internet services for businesses operating web sites or other application that generate e-commerce transactions for the business. Instead of paying a monthly fee for the Internet services required to host a web site or operate and e-commerce site, the business contracts with the commissioned e-commerce service provider to provide these services based on receiving a percentage commission of the commercial transactions generated using these services. Preferably, the commission percentage is tiered in accordance with the amount of traffic at the site to provide a nominal level of service at a lower commission rate, yet allow for an exceptional volume of traffic to be accommodated by the site at a higher commission rate without having the site fail or the service become overwhelmed.

24 Claims, 13 Drawing Sheets

U.S. PATENT DOCUMENTS

| | | | |
|---|---|---|---|
| 5,247,427 A | 9/1993 | Driscoll et al. | |
| 5,251,097 A | 10/1993 | Simmons et al. | |
| 5,303,297 A | 4/1994 | Hillis | |
| 5,335,343 A | 8/1994 | Lampson et al. | |
| 5,351,286 A | 9/1994 | Nici | |
| 5,371,848 A | 12/1994 | Casey et al. | |
| 5,460,441 A | 10/1995 | Hastings et al. | |
| 5,473,773 A | 12/1995 | Aman et al. | |
| 5,487,170 A | 1/1996 | Bass et al. | |
| 5,488,541 A | 1/1996 | Mistry et al. | |
| 5,504,894 A | 4/1996 | Ferguson et al. | |
| 5,504,899 A | 4/1996 | Raz | |
| 5,504,900 A | 4/1996 | Raz | |
| 5,537,542 A | 7/1996 | Eilert et al. | |
| 5,539,883 A | 7/1996 | Allon et al. | |
| 5,548,683 A | 8/1996 | Engel et al. | |
| 5,586,312 A | 12/1996 | Johnson et al. | |
| 5,615,329 A | 3/1997 | Kern et al. | |
| 5,630,081 A | 5/1997 | Rybicki et al. | |
| 5,664,106 A | 9/1997 | Caccavale | |
| 5,675,739 A | 10/1997 | Eilert et al. | |
| 5,675,785 A | 10/1997 | Hall et al. | |
| 5,696,895 A | 12/1997 | Hemphill et al. | |
| 5,701,480 A | 12/1997 | Raz | |
| 5,745,884 A | 4/1998 | Carnegie et al. | |
| 5,764,915 A | 6/1998 | Heimsoth et al. | |
| 5,771,354 A | 6/1998 | Crawford | |
| 5,774,668 A | 6/1998 | Choquier et al. | |
| 5,794,221 A | 8/1998 | Egendorf | |
| 5,795,228 A | 8/1998 | Trumbull et al. | |
| 5,819,092 A | 10/1998 | Ferguson et al. | |
| 5,822,531 A | 10/1998 | Gorczyca et al. | |
| 5,828,737 A | 10/1998 | Sawyer | |
| 5,832,222 A | 11/1998 | Dziadosz et al. | |
| 5,845,267 A | 12/1998 | Ronen | |
| 5,875,306 A | 2/1999 | Bereiter | |
| 5,877,938 A | 3/1999 | Hobbs et al. | |
| 5,889,944 A | 3/1999 | Butt et al. | |
| 5,899,980 A | 5/1999 | Wilf et al. | |
| 5,901,228 A | 5/1999 | Crawford | |
| 5,912,802 A | 6/1999 | Nelson | |
| 5,928,323 A | 7/1999 | Gosling et al. | |
| 5,938,732 A | 8/1999 | Lim et al. | |
| 5,946,670 A | 8/1999 | Motohashi et al. | |
| 5,948,065 A | 9/1999 | Eilert et al. | |
| 5,951,694 A | 9/1999 | Choquier et al. | |
| 5,956,391 A | 9/1999 | Melen et al. | |
| 5,956,697 A | 9/1999 | Usui | |
| 5,974,462 A | 10/1999 | Aman et al. | |
| 5,978,577 A | 11/1999 | Rierden et al. | |
| 5,983,225 A | 11/1999 | Anfindsen | |
| 5,983,326 A | 11/1999 | Hagersten et al. | |
| 5,987,621 A | 11/1999 | Duso et al. | |
| 5,991,792 A | 11/1999 | Nageswaran | |
| 5,999,965 A * | 12/1999 | Kelly | 709/202 |
| 6,006,259 A | 12/1999 | Adelman et al. | |
| 6,011,791 A | 1/2000 | Okada et al. | |
| 6,014,651 A | 1/2000 | Crawford | |
| 6,014,669 A | 1/2000 | Slaughter et al. | |
| 6,025,989 A | 2/2000 | Ayd et al. | |
| 6,035,281 A * | 3/2000 | Crosskey et al. | 705/14.69 |
| 6,035,356 A | 3/2000 | Khan et al. | |
| 6,038,587 A | 3/2000 | Phillips et al. | |
| 6,041,354 A | 3/2000 | Biliris et al. | |
| 6,067,545 A | 5/2000 | Wolff | |
| 6,067,580 A * | 5/2000 | Aman et al. | 719/330 |
| 6,070,191 A | 5/2000 | Narendran et al. | |
| 6,088,727 A | 7/2000 | Hosokawa et al. | |
| 6,088,816 A | 7/2000 | Nouri et al. | |
| 6,092,178 A * | 7/2000 | Jindal et al. | 712/27 |
| 6,094,351 A | 7/2000 | Kikinis | |
| 6,094,680 A | 7/2000 | Hokanson | |
| 6,097,882 A * | 8/2000 | Mogul | 709/201 |
| 6,105,067 A | 8/2000 | Batra | |
| 6,108,703 A | 8/2000 | Leighton et al. | |
| 6,112,243 A | 8/2000 | Downs et al. | |
| 6,115,693 A | 9/2000 | McDonough et al. | |
| 6,134,673 A | 10/2000 | Chrabaszcz | |
| 6,145,098 A | 11/2000 | Nouri et al. | |
| 6,151,688 A | 11/2000 | Wipfel et al. | |
| 6,154,787 A | 11/2000 | Urevig et al. | |
| 6,157,927 A | 12/2000 | Schaefer et al. | |
| 6,167,446 A | 12/2000 | Lister et al. | |
| 6,170,067 B1 | 1/2001 | Liu et al. | |
| 6,173,322 B1 | 1/2001 | Hu | |
| 6,182,109 B1 | 1/2001 | Sharma et al. | |
| 6,185,598 B1 | 2/2001 | Farber et al. | |
| 6,199,111 B1 | 3/2001 | Hara et al. | |
| 6,199,173 B1 | 3/2001 | Johnson et al. | |
| 6,209,018 B1 | 3/2001 | Ben-Shachar et al. | |
| 6,216,185 B1 | 4/2001 | Chu | |
| 6,223,202 B1 | 4/2001 | Bayeh | |
| 6,230,183 B1 | 5/2001 | Yocom et al. | |
| 6,233,587 B1 | 5/2001 | Tandon | |
| 6,243,737 B1 | 6/2001 | Flanagan et al. | |
| 6,243,838 B1 | 6/2001 | Liu et al. | |
| 6,266,721 B1 | 7/2001 | Sheikh et al. | |
| 6,272,675 B1 | 8/2001 | Schrab et al. | |
| 6,279,001 B1 | 8/2001 | DeBettencourt et al. | |
| 6,298,451 B1 | 10/2001 | Lin | |
| 6,301,612 B1 | 10/2001 | Selitrennikoff et al. | |
| 6,317,773 B1 | 11/2001 | Cobb et al. | |
| 6,324,580 B1 | 11/2001 | Jindal et al. | |
| 6,327,579 B1 | 12/2001 | Crawford | |
| 6,330,689 B1 | 12/2001 | Jin et al. | |
| 6,338,112 B1 | 1/2002 | Wipfel et al. | |
| 6,374,243 B1 | 4/2002 | Kobayashi et al. | |
| 6,374,297 B1 | 4/2002 | Wolf et al. | |
| 6,389,012 B1 | 5/2002 | Yamada et al. | |
| 6,405,317 B1 | 6/2002 | Flenley et al. | |
| 6,411,943 B1 | 6/2002 | Crawford | |
| 6,411,956 B1 | 6/2002 | Ng | |
| 6,412,079 B1 | 6/2002 | Edmonds et al. | |
| 6,421,661 B1 | 7/2002 | Doan et al. | |
| 6,421,688 B1 | 7/2002 | Song | |
| 6,421,777 B1 | 7/2002 | Pierre-Louis et al. | |
| 6,425,006 B1 | 7/2002 | Chari et al. | |
| 6,430,618 B1 | 8/2002 | Karger et al. | |
| 6,442,618 B1 | 8/2002 | Phillips et al. | |
| 6,446,200 B1 | 9/2002 | Ball et al. | |
| 6,452,809 B1 * | 9/2002 | Jackson et al. | 361/796 |
| 6,460,082 B1 | 10/2002 | Lumelsky et al. | |
| 6,463,454 B1 | 10/2002 | Lumelsky et al. | |
| 6,496,828 B1 | 12/2002 | Cochrane et al. | |
| 6,504,996 B1 | 1/2003 | Na et al. | |
| 6,519,553 B1 | 2/2003 | Barnette et al. | |
| 6,519,679 B2 | 2/2003 | Devireddy et al. | |
| 6,532,488 B1 | 3/2003 | Ciarlante et al. | |
| 6,542,926 B2 | 4/2003 | Zalewski et al. | |
| 6,553,416 B1 | 4/2003 | Chari et al. | |
| 6,553,420 B1 | 4/2003 | Karger et al. | |
| 6,574,748 B1 | 6/2003 | Andress et al. | |
| 6,578,147 B1 | 6/2003 | Shanklin et al. | |
| 6,587,938 B1 | 7/2003 | Eilert et al. | |
| 6,601,096 B1 | 7/2003 | Lassiter, Jr. | |
| 6,606,253 B2 | 8/2003 | Jackson et al. | |
| 6,608,832 B2 | 8/2003 | Forslow | |
| 6,615,199 B1 | 9/2003 | Bowman-Amuah | |
| 6,615,265 B1 | 9/2003 | Leymann et al. | |
| 6,625,639 B1 * | 9/2003 | Miller et al. | 718/106 |
| 6,633,916 B2 | 10/2003 | Kauffman | |
| 6,640,244 B1 | 10/2003 | Bowman-Amuah | |
| 6,640,249 B1 | 10/2003 | Bowman-Amuah | |
| 6,647,508 B2 | 11/2003 | Zalewski et al. | |
| 6,651,125 B2 | 11/2003 | Maergner et al. | |
| 6,681,316 B1 | 1/2004 | Clermidy et al. | |
| 6,681,342 B2 | 1/2004 | Johnson et al. | |
| 6,684,343 B1 | 1/2004 | Bouchier et al. | |
| 6,687,729 B1 | 2/2004 | Sievert et al. | |
| 6,687,831 B1 | 2/2004 | Albaugh et al. | |
| 6,704,737 B1 | 3/2004 | Nixon et al. | |
| 6,704,768 B1 | 3/2004 | Zombek et al. | |
| 6,714,980 B1 | 3/2004 | Markson et al. | |
| 6,715,145 B1 | 3/2004 | Bowman-Amuah | |
| 6,718,359 B2 | 4/2004 | Zisapel et al. | |
| 6,718,415 B1 | 4/2004 | Chu | |
| 6,721,568 B1 | 4/2004 | Gustavsson et al. | |

| | | | |
|---|---|---|---|
| 6,725,317 B1 | 4/2004 | Bouchier et al. | |
| 6,728,958 B1 | 4/2004 | Klein et al. | |
| 6,742,015 B1 | 5/2004 | Bowman-Amuah | |
| 6,779,016 B1 | 8/2004 | Aziz et al. | |
| 6,816,903 B1 | 11/2004 | Rakoshitz et al. | |
| 6,816,905 B1 | 11/2004 | Sheets et al. | |
| 6,820,171 B1 | 11/2004 | Weber et al. | |
| 6,826,709 B1 | 11/2004 | Clermidy et al. | |
| 6,832,238 B1 | 12/2004 | Sharma et al. | |
| 6,839,700 B2 | 1/2005 | Doyle et al. | |
| 6,842,906 B1 | 1/2005 | Bowman-Amuah | |
| 6,853,642 B1 | 2/2005 | Sitaraman et al. | |
| 6,871,210 B1 | 3/2005 | Subramanian | |
| 6,877,035 B2 | 4/2005 | Shahabuddin et al. | |
| 6,898,642 B2 | 5/2005 | Chafle et al. | |
| 6,901,442 B1 | 5/2005 | Schwaller et al. | |
| 6,938,256 B2 | 8/2005 | Deng et al. | |
| 6,950,848 B1 | 9/2005 | Yousefi'zadeh | |
| 6,952,401 B1 | 10/2005 | Kadambi et al. | |
| 6,963,915 B2 | 11/2005 | Karger et al. | |
| 6,973,517 B1 | 12/2005 | Golden et al. | |
| 6,985,967 B1 | 1/2006 | Hipp | |
| 6,986,139 B1 | 1/2006 | Kubo | |
| 7,032,241 B1 | 4/2006 | Venkatachary et al. | |
| 7,051,098 B2 | 5/2006 | Masters et al. | |
| 7,051,188 B1 | 5/2006 | Kubala et al. | |
| 7,055,052 B2 | 5/2006 | Chalasani et al. | |
| 7,080,051 B1 | 7/2006 | Crawford | |
| 7,085,837 B2 | 8/2006 | Kimbrel et al. | |
| 7,099,981 B2 * | 8/2006 | Chu | 710/301 |
| 7,140,020 B2 | 11/2006 | McCarthy et al. | |
| 7,146,446 B2 | 12/2006 | Chu | |
| 7,185,112 B1 | 2/2007 | Kuranari et al. | |
| 7,228,546 B1 | 6/2007 | McCarthy et al. | |
| 7,289,964 B1 | 10/2007 | Bowman-Amuah | |
| 7,328,297 B2 | 2/2008 | Chu | |
| 7,363,415 B2 | 4/2008 | Chu | |
| 7,363,416 B2 | 4/2008 | Chu | |
| 7,376,779 B2 | 5/2008 | Chu | |
| 7,433,931 B2 * | 10/2008 | Richoux | 709/217 |
| RE41,092 E | 1/2010 | Chu | |
| 7,676,624 B2 | 3/2010 | Chu | |
| 7,693,993 B2 * | 4/2010 | Sheets et al. | 709/226 |
| 7,711,789 B1 * | 5/2010 | Jnagal et al. | 709/213 |
| 7,730,172 B1 | 6/2010 | Lewis | |
| 7,764,683 B2 | 7/2010 | DiGiorgio | |
| 7,765,299 B2 * | 7/2010 | Romero | 709/226 |
| 7,782,869 B1 * | 8/2010 | Chitlur Srinivasa | 370/395.41 |
| 7,844,513 B2 | 11/2010 | Smith | |
| 7,949,677 B2 * | 5/2011 | Croft et al. | 707/781 |
| 8,209,695 B1 * | 6/2012 | Pruyne et al. | 718/104 |
| 2001/0039581 A1 | 11/2001 | Deng et al. | |
| 2002/0007468 A1 | 1/2002 | Kampe et al. | |
| 2002/0083078 A1 | 6/2002 | Pardon et al. | |
| 2002/0091854 A1 | 7/2002 | Smith | |
| 2002/0107877 A1 | 8/2002 | Whiting et al. | |
| 2002/0124083 A1 | 9/2002 | Jeyaraman et al. | |
| 2003/0037092 A1 | 2/2003 | McCarthy et al. | |
| 2003/0039237 A1 | 2/2003 | Forslow | |
| 2004/0162901 A1 | 8/2004 | Mangipudi et al. | |
| 2005/0076214 A1 | 4/2005 | Thomas | |
| 2005/0182838 A1 | 8/2005 | Sheets et al. | |
| 2006/0036743 A1 | 2/2006 | Deng et al. | |
| 2006/0129687 A1 | 6/2006 | Goldszmidt et al. | |
| 2007/0140242 A1 | 6/2007 | DiGiorgio | |
| 2009/0262741 A1 * | 10/2009 | Jungck et al. | 370/392 |
| 2010/0268827 A1 | 10/2010 | Sheets et al. | |
| 2011/0010427 A1 * | 1/2011 | Jnagal et al. | 709/213 |
| 2011/0191462 A1 | 8/2011 | Smith | |
| 2011/0238564 A1 * | 9/2011 | Lim et al. | 705/38 |

FOREIGN PATENT DOCUMENTS

| | | |
|---|---|---|
| EP | 0844577 A2 | 5/1887 |
| EP | 0833514 A2 | 4/1998 |
| EP | 0844577 A3 | 2/1999 |
| EP | 0873009 B1 | 11/2005 |
| EP | 1 091 296 A2 | 4/2011 |
| JP | 11027635 A | 1/1999 |
| JP | 11-120127 A | 4/1999 |
| JP | 2000-040115 | 2/2000 |
| JP | 2002-132741 | 5/2002 |
| JP | 2002-202959 | 7/2002 |
| JP | 2002-245017 | 8/2002 |
| JP | 2004-082911 | 3/2004 |
| JP | 2004-519749 A | 7/2004 |
| KR | 0840960 | 6/2008 |
| WO | WO 00/04458 A1 | 1/2000 |
| WO | WO 00/14634 A1 | 3/2000 |
| WO | WO 01/67707 A2 | 3/2001 |
| WO | WO 02/01347 A2 | 1/2002 |
| WO | WO 02/07037 A1 | 1/2002 |
| WO | WO 02/08891 A2 | 1/2002 |

OTHER PUBLICATIONS

Management of the Access Network and Service Provisioning, Jani Hursti, Seminar in Networking, Helsinki University of Technology, 20 pgs.; Apr. 1999.

Web site print-out: Luminate Introduces Luminate.Net e-Service, Luminate, Inc., 2 pgs.; Copyright 2000.

A New Twist on Hosting: Luminate Pitches Its Enterprise Management Services, Chris Gonsalves, PC Week Online, 3 pgs.; Mar. 2000.

Web site print-out: Lightspeed Systems, Corporate Overview, 3 pgs., Copyright 1999.

Web site print-out: table of contents and chapter abstracts for—ISP Survival Guide: Stratetgies for Running a Competitive ISP, Geoff Huston, Wiley Computer Publishing, 16 pgs.; Oct. 1998.

Web site print-out: Remedy AR System Integration Module for PATROL, BMC Software, Inc., 2 pgs., Copyright 2001.

Web site print-out: PATROL® SRM: The Foundation of Application-Centric Storage Management®, BMC Software, Inc., 2 pgs.; Copyright 2001.

Web site print-out: PATROL® for Performance Management-Prediction in Action, BMC Software, Inc., 2 pgs.; Copyright 2001.

Web site print-out: Frequently Asked Questions—Overview of PATROL®, BMC Software, Inc., 4 pgs.; Copyright 2001.

Excite@Home Launches Free Service for Merchants, Andrea Orr, MicroTimes Magazine, plus web site print-out; 3 pgs.; Aug. 2000.

Web site print-out: Ascendant Solutions, Inc. Fact Sheet, Ascendant Solutions, Inc.; 4 pgs.; Copyright 1998-2000.

Web site print-out: Comprehensive Hosting Solution for ISVs, ebaseone Corporation, 3 pgs.; Copyright 2000.

The Landlords of Cyberspace, Christopher Heun, informationweek. com; 3 pgs.; Jul. 2000.

Magazine advertisement: ISP Upgrade, CAIS Software Solutions, 3 pgs.; Copyright 1999.

Brochure: Applicast™, Applicast, Inc.; 6 pgs.; Copyright 1999.

Web site print-out: ASP Computer Systems Corp.; Data Return Corporation, 3 pgs.; Copyright 2000.

White Paper: Stratus ftServers: Enhancing Software Reliability and Availability for Windows 2000, Stratus Computer Systems; 10 pgs.; Copyright 2000.

Web site print-out: Cellular MultiProcessing—Breakthrough Architecture for an Open Mainframe, Unisys, 4 pgs.; Copyright 2000.

Web site print-out: ClearPath Enterprise Servers—What is HMP?, Unisys, 2 pgs.; Copyright 2000.

Brochure: HP OpenView Customer Views 1.0 for Network Node Manager, Hewlett -Packard Company, 4 pgs.; Copyright 1999.

Brochure: Get Connected—Cable & Wireless Enhanced Solutions Provider Program, Cable & Wireless USA, Inc., 4 pgs.; Copyright 1999.

Web site print-out: Resonate®, Resonate, Inc.; 1 pg.; Copyright 1999.

Web site print-out: ISP Power Overview, inovaware.com, Inovaware Corporation; 2 pgs.; copyright 1997-2000.

Web site print-out: XaCCT Offers Multivendor, Multitechnology Billing Model for ISP Consumption, John Morency, Network World Fusion on Network/Systems Management, Network World, Inc.; 3 pgs.; Sep. 1998.

Web site print-out: Internet Shock Absorber, Cable and Wireless plc., 5 pgs.; Copyright 2000.

Web site print-out: Epoch Internet Introduces New 'POD' Architecture, An Innovative Approach to Providing Web Hosting Services, epoch.net, Epoch Networks, Inc., 4 pgs.; Copyright 2000.

Web site print-out: Frequently Asked Questions—Complex Web Services, USinternetworking, Inc.; 3 pgs.; Copyright 1998-1999.

Brochure: ControlIT™—Remote Control Without Boundaries, Computer Associates International, Inc.; 10 pgs.; Copyright 2000.

Brochure: HP OpenView, Hewlett-Packard Company, 16 pgs.; Copyright 1999.

White Paper: The HP OpenView Approach to Change and Configuration Management, Hewlett-Packard Company, 23 pgs.; Copyright 1999.

Web site print-out: White Paper: Tivoli Service Provider Solutions, Tivoli Systems, Inc.; 24 pgs.; Copyright 1999.

Brochure: Tivoli® Global Enterprise Manager—A Business-focused Approach to Systems Management, Tivoli Systems, Inc.; 4 pgs.; Copyright 2000.

Brochure: Tivoli® Cross-Site for Security, Tivoli Systems, Inc.; 4 pgs.; Copyright 2000.

Brochure: Tivoli® Cross-Site for Deployment—Using the Internet as a Valuable Deployment Tool, Tivoli Systems, Inc.; 4 pgs.; Copyright 2000.

Brochure: Tivoli® Cross-Site for Availability, Tivoli Systems, Inc.; 4 pgs.; Copyright 1999.

Brochure: Tivoli Problem Management Suite, Tivoli Systems, Inc.; 4 pgs.; Copyright 1999.

Brochure: Tivoli® Distributed Monitoring—Automated, Consistent Availability Solution, Tivoli Systems, Inc.; 4 pgs.; Copyright 2000.

Brochure: Tivoli Technical Brief for Service Providers, Tivoli Systems, Inc., 7 pgs.; Copyright 1999.

Brochure: Tivoli Cross-Site—Internet Application Management Technical Brief, Tivoli Systems, Inc.; 22 pgs.; Copyright 1999.

ADSM: A Multi-Platform, Scalable, Backup and Archive mass Storage System; Luis-Felipe Cabrera et al.; 1063-6390/95, 1995 IEEE; pp. 420-427.

Web site print-out; Coblat RaQ, Cobalt Network Systems; 2 pgs. © 2001.

Web site print-out: HP'S Answer for Portal Performance—A -class Servers; Hewlett-Packard Company, 2 pgs. © 2000.

White paper: IBM Netfinity X-architecture, IBM Corporation; 22 pgs.; © 1998.

Boot Integrity Services Application programming Interface, Intel Corporation, ver. 1.0, Dec. 28, 1998, 64 pages.

Cluster Computing White Paper, Mark Baker, University of Portsmouth, ver. 1.0b, Apr. 10, 2000, 64 pages.

Cluster Computing White Paper, Mark Baker, University of Portsmouth, ver. 2.0b, Dec. 28, 2000, 119 pages.

Preboot Execution Environment (PXE) Specification, ver. 2.1, Intel Corporation, Sep. 20, 1999, 103 pages.

Wired for Management Baseline, Intel Corporation, ver. 2.0, Dec. 18, 1998, 119 pages.

Devlin et al., Scalability Terminology: Farms, Clones, Partitions, and Packs: RACS and RAPS, Microsoft Corp., Technical Report MS-TR-99-85, Dec. 1999, 9 pages.

Morjan, Distributed Image Management (DIM) for Cluster Administration, IBM, Inc., 1996, 10 pages.

Kapadia & Fortes, PUNCH: an architecture for Web-enabled wide-area network-computing, Cluster Computing 2, School of Electrical and Computer Engineering Purdue University, (1999) pp. 153-164.

Barak & La'adan, The MOSIX multicomputer operating system for high performance cluster computing, Future Generation Computer Systems 13 (1997/98) pp. 361-372.

Thekkath et al., Frangipani: A Scalable Distributed File System, 1997 ACM, Systems Research Center Digital Equipment Corporation, pp. 224-237.

Stelling et al., A fault detection service for wide area distributed computing, Cluster Computing, 1999, pp. 117-128.

William E. Snaman, Jr., Application Design in a VAXcluster System, Digital Technical Journal vol. 3 No. 3 Summer 1991, pp. 1-10.

Rome Laboratory Software Engineering Cooperative Virtual Machine, Air Force Materiel Command, RL-TR-94-221, Dec. 1994, 73 pages.

Friedman, et al., Symphony: managing virtual servers in the global village, Department of Computer Science, Euro-Par 1999, LNCS 1685, pp. 777-784.

Sun Enterprise 10000 Server (Starfire), Technical White Paper, Sun Microsystems, Sep. 1998, pp. 1-32.

Ultra™ Enterprise™ 10000 Server: SunTrust™ Reliability, Availability, and Serviceability, Technical White Paper, Sun Microsystems, 1997, 36 pages.

Hohman, ArrowPoint to give Web switch Gigabit Ethernet boost, Network World, Southborough: May 10, 1999. vol. 16, Iss. 19; p. 24, 2 pgs.

Memo, Intel Preboot Execution Environment, Intel Corporation, Dec. 1999, 17 pages.

Katz et al., A Scalable HTTP Server: The NCSA Prototype, Computer Networks and ISDN Systems 27 (1994), 10 pages.

Epema et al., A worldwide flock of Condors: Load sharing among workstation clusters, Future Generation Computer Systems 12 (1996) pp. 53-65.

Evers, Condor Flocking: Load Sharing between Pools of Workstations, Apr. 1993; 63 pages.

Zhou et al., Utopia: a Load Sharing Facility for Large, Heterogeneous Distributed Computer Systems, Software—Practice and Experience, vol. 23(12), pp. 1305-1336 (Dec. 1993).

Ferstl, Job and resource-management systems in heterogeneous clusters, GENIAS Software GmbH, Sep. 1995, pp. 39-51.

Damani et al., ONE-IP: techniques for hosting a service on a cluster of machines, Computer Networks and ISDN Systems 29 (1997), pp. 1019-1027.

Sue Mazingo, Internet Server Load Balancing, Digital Systems Report; Summer 1999; 21, 2; Sciences Module, p. 27.

Ludmila Cherkasova, Scalable Web Hosting Service, HP Laboratories Palo Alto, HPL-1999-52(R.1) Oct. 1999, pp. 1-26.

Ludmila Cherkasova, FLEX: Design and Management Strategy for Scalable Web Hosting Service, HP Laboratories Palo Alto, HPL-1999-64(R.1) Oct. 1999, pp. 1-38.

Evans & Butt, Load balancing with network partitioning using host groups, Parallel Computing 20 (1994), pp. 325-345.

Marco Pistoia & Corinne Letilley, IBMWebSphere Performance Pack: Load Balancing with IBM SecureWay Network Dispatcher, IBM Corp., Oct. 1999, 438 pages.

Eberle & Oertli, Switcherland: A QoS Communication Architecture for Workstation Clusters, Swiss Federal Institute of Technology (ETH) IEEE Int. Symp on Computer Architectures, Jul. 1998, 12 pages.

Matta, On Network Resource Management for End-to-End QoS, Computer Science Department Boston University (1999), 20 pages.

Pandey et al., Supporting Quality of Service in HTTP servers, (ACM Symp. on Principles of Distributed Computing) Parallel and Distributed Computing Laboratory Computer Science Department, 1998, 11 pages.

Michael Cooney, IBM seeks to ease server load, Network World, Southborough: Jun. 16, 1997. vol. 14, Iss. 24; p. 16, 2 pages.

Jaruzelski et al., ASP 101: Understanding the Application Service Provider Model, Booz Allen & Hamilton, Jul. 2000, 12 pages.

Gerhard Mourani, Get Acquainted with Linux Security and Optimization System, Open Network Architecture, ver. 1.1, Jan. 11, 2000, pp. 1-352.

Cameron & Patrick, BT WebWorld, BT Technol J vol. 15 No. 2, Apr. 1997, pp. 138-144.

BEA WebLogic Enterprise, Administration Guide, BEA Systems, Inc., ver. 5.1, May 2000, 395 pages.

Radha Subrahmanyan, Performance monitoring of the Apache Web Server, Masters Thesis, University of Ottawa, Ontario, 1999, 77 pages.

Beth Snyder, Wired Digital adds commerce to site, Advertising Age v68, n39 (Sep. 29, 1997) : 38.

Clinton Wilder, Firmbuy offers hosted procurement site, Informationweek, n772 (Feb. 7, 2000) : 101.

Ubrandit.com allows anyone to operate an online business, Direct Marketing v62, n8 (Dec. 1999) : 8.

Lee Copeland, Online car market revs up, ComputerWorld v34, n5 (Jan. 31, 2000) :10.

Cathy Taylor, Stop 'n shop with C/Net, Mediaweek v6, n37 (Sep. 9, 1996) : 12.
Reexam Application No. 90/011783, filed Jul. 1, 2011, Assignee Galactic Computing Corporation BVI/IDC.
Reexam Application No. 90/011784, filed Jul. 28, 2011, Assignee Galactic Computing Corporation BVI/IDC.
ISP Survival Guide: Strategies for Running a Competitive ISP, Geoff Huston, (©1999). 617 pages (5 Parts (Chap. 1-4; Chap. 5-8; Chap. 9-12; Chap. 13-16; Glossary)).
"Simplified Guide to the Java TM 2 Platform Enterprise Edition," Sun Microsystems, Inc., 1999, 20 pages.
BEA WebLogic Enterprise 5.1, BEA Systems, Inc., 2000, pp. 1-367.
Breitbart et al., "Replication and Consistency Being Lazy Helps Sometimes," PODS '97, Jun. 1997, pp. 173-184.
Dogac et al., "METU Interoperable Database System," Demo Description, In Proc. Of ACM Sigmod Intl. Conf. On Management of Data, Jun. 1996, 6 pages.
Efficient and Flexible Methods for Transient Versioning of Records to Avoid Locking by Read-Only Transactions, 1992 ACM SIGMOD, Jun. 1992, pp. 124-133.
Govil K. et al: "Cellular Disco: Resource Management using Virtual Clusters on Shared-Memory Multiprocessors" Computer Systems Laboratory, Stanford University, Dec. 1999, pp. 154-169.
Initial Context, JNDI 1.2.1 Specification: Class Initial Context, Jul. 14, 1999, pp. 1-21.
iPlanet Application Server 6.0 Administration Guide: Chapter 4 Logging Server Messages, Sep. 5, 2000, pp. 1-17.
iPlanet Application Server 6.0 Administration Guide: Chapter 9 Administering Transactions, Sep. 5, 2000, pp. 1-24.
R. J. Abbott, Resourceful Systems and Software Fault Tolerance, ACM 0-89791-271-3/88/0006, pp. 992-1000, 1988.
Ravindran et al., Resource Management MiddleWare for Dynamic, Dependable Real-Time Systems, Real-Time Systems, 2000, pp. 1-15.
S. Han, et al., Fast Restoration of Real-Time Communication Service from Component Failures in Multi-hop Networks, Proc. of ACM SIGCOMM Symposium, vol. 27, No. 4, pp. 77-88, (Oct. 1997).
Stelling, et al. A fault detection service for wide area distributed computations, Journal Cluster Computing, 1999, pp. 1-11.
T. Wu, A Passive Protected Self-Healing Mesh Network Architecture and Applications, IEEE, ACM Transactions on Networking, vol. 2 No. 1 pp. 40-52 (Feb. 1994).
Tierby B et al., "A network-aware distributed storage cache for data intensive environments," High Performance Distributed Computing, 1999, pp. 1-9.
Application and File History of U.S. Appl. No. 09/709,820, filed Nov. 10, 2000, now U.S. Patent No. 6,452,809, issued Sep. 17, 2002, Inventors Jackson et al.
Application and File History of U.S. Appl. No. 09/710,095, filed Nov. 10, 2000, now U.S. Patent No. 6,816,905, issued Nov. 9, 2004, Inventors Sheets et al.
Application and File History of U.S. Appl. No. 09/765,766, filed Jan. 18, 2001, now U.S. Patent No. 6,938,256, issued Aug. 30, 2005, Inventors Deng et al.
Application and File History of U.S. Appl. No. 09/907,520, filed Jul. 17, 2001, now U.S. Patent No. 7,844,513, issued Nov. 30, 2010, Inventor Smith.
Application and File History of U.S. Appl. No. 10/244,450, filed Sep. 16, 2002, now U.S. Patent No. 6,606,253, issued Aug. 12, 2002, Inventors Jackson et al.
Application and File History of U.S. Appl. No. 11/202,644, filed Aug. 12, 2005, Inventors Deng et al.
Application and File History of U.S. Appl. No. 10/984,959, filed Nov. 8, 2004, now U.S. Patent No. 7,693,993, issued Apr. 6, 2010, Inventors Sheets et al.
Application and File History of U.S. Appl. No. 12/748,063, filed Mar. 26, 2010, Inventors Sheets et al.
Application and File History of U.S. Appl. No. 12/957,026, filed Nov. 30, 2010, Inventors Smith.
EP Application No. 01952274.7, filed Jun. 28, 2011, Applicant Galactic Computing Corp BV, Examination Report dated Jun. 15, 2010, 5 pages.
EP Application No. 01952274.7, filed Jun. 28, 2011, Applicant Galactic Computing Corp BV, Examination Report dated Apr. 1, 2008, 7 pages.
EP Application No. 01952274.7, filed Jun. 28, 2011, Applicant Galactic Computing Corp BV, Supplemental European Search Report, dated Dec. 3, 2007, 3 pages.
Japanese Application No. 2002-512872, filed Jun. 28, 2001, Applicant Galactic Computing Corp BV, Decision of Refusal, dated Nov. 2, 2010, 2 pages.
Japanese Application No. 2002-512872, filed Jun. 28, 2001, Applicant Galactic Computing Corp BV, Notifications of Reason(s) for Refusal, dated Oct. 6, 2009, 6 pages.
Canadian Application No. 2,415,770, filed Jun. 28, 2011, Applicant Galactic Computing Corp BV, Examination Report, dated Apr. 27, 2007, 2 pages.
Canadian Application No. 2,415,770, filed Jun. 28, 2011, Applicant Galactic Computing Corp BV, Examination Report, dated Dec. 22, 2004, 4 pages.
PCT/US2001/20571, filed Jun. 28, 2001, Applicant Galactic Computing BV, International Preliminary Examination Report, dated Jan. 14, 2004, 3 pages.
PCT/US2001/20571, filed Jun. 28, 2001, Applicant Galactic Computing BV, Search Report, dated Oct. 15, 2001, 2 pages.

* cited by examiner

FUNCTIONAL VIEW OF TRADITIONAL WEB SERVER FARM

METHOD AND SYSTEM FOR ALLOCATING COMPUTING RESOURCES

RELATED APPLICATION

This application is a continuation of application Ser. No. 12/957,026 filed Nov. 30, 2010, which is a continuation of Ser. No. 09/907,520, filed Jul. 17, 2001, now U.S. Pat. No. 7,844,513, which is a continuation-in-part of Ser. No. 09/710,095, filed Nov. 10, 2000, now U.S. Pat. No. 6,816,905, which claims the benefit of U.S. Provisional Application No. 60/218,602 filed Jul. 17, 2000, each of which is hereby fully incorporated herein by reference.

FIELD OF THE INVENTION

The present invention relates generally to the field of data processing business practices. More specifically, the present invention relates to a method and system for operating a commissioned e-commerce service provider that provides services to businesses on a computerized network such as the Internet in exchange for a small commission on the commercial transactions generated using those services.

BACKGROUND OF THE INVENTION

The explosive growth of the Internet as a computerized network has been driven to large extent by the emergence of commercial Internet Service Providers (ISPs). Commercial ISPs provide users with access to the Internet in the same way that telephone companies provide 30 customers with access to the international telephone network. The vast majority of commercial ISPs charge for this access in ways similar to the ways in which telephone companies charge their customers. Originally, it was customary for an ISP to charge its users based on the time they were connected, just as telephone companies charge for long distance services. Now, most ISPs have adopted a flat monthly access rate that is similar to the way in which telephone companies charge for local telephone service. All of these charges are essentially metered charges where a fee is charged for access for a given period of time, i.e. so many cents per minute or so many dollars per month.

There are many reasons for the similarities between the metered billing practices of ISPs and telephone companies. Both the computerized Internet network and international telephone network utilize the same backbone of high-speed, high bandwidth communication channels to carry voice and data traffic over long distances. A significant portion of the data traffic between users and ISPs also occurs over local telephone networks using dial-up modems. Many of the larger ISPs are divisions of, or affiliates of, telephone companies. Like telephone companies, ISPs may be subject to governmental regulation as common carriers or utilities. Perhaps most importantly, there are only a handful of firms that provide the backbone network connections required by an ISP and all of these firms utilize metered billing practices in charging for these carriage costs. Backbone network connection costs constitute a significant portion of the typical cost profile of an ISP, and, in the case of the non-North American ISP can constitute the vast majority of the cost profile of that provider. The details of how such metered billing arrangements for telephonic and network connections are accomplished have been the subject, for example, of U.S. Pat. Nos. 3,764,747, 5,187,710, 5,303,297, 5,351,286, 5,745,884, 5,828,737, 5,946,670, 5,956,391, and 5,956,697.

For ISPs, numerous software billing packages are available to account and bill for these metered charges, such as XaCCT from rens.com and ISP Power from inovaware.com. Other software programs have been developed to aid in the management of ISP networks, such as IP Magic from lightspeedsystems.com, Internet Services Management from resonate.com and MAMBA from luminate.com. The management and operation of an ISP also has been the subject of numerous articles and seminars, such as Hursti, Jani, "Management of the Access Network and Service Provisioning," Seminar in Internetworking, Apr. 19, 1999. An example of the offerings of a typical ISP at a given monthly rate in terms of available configurations of hardware, software, maintenance and support for providing commercial levels of Internet access and website hosting can be found at rackspace.com.

The various factors involved in establishing pricing strategies for ISPs are discussed in detail by Geoff Huston in ISP Survival Guide: Strategies For Running A Competitive ISP, Chap. 13, pp. 497-535 (1999). He identifies five major attributes of the access service of an ISP that are folded into the retail tariff to be charged by that ISP, including access, time, volume, distance and quality. Where cost of service operations are greater than the carriage costs, it is typical to use a monthly flat rate access pricing because of the ease of implementation, simplicity, scalability and competitive environment for these providers. Where the carriage costs dominate, a monthly flat rate tariff may present an unacceptable business risk, and some form of incremental tariff structure based on more closely monitored metered usage may be preferred. Although Mr. Huston expects the ISP industry to stabilize and consolidate as larger players begin to dominate the industry, he notes that predictions of market stability within the Internet continue to be confounded by the experience of constant robust growth and evolution in service models.

One such point of evolution has been the emergence of a small number of ISPs, such as netzero.com and freeInet.com, which are providing their service for free to individual end users. Instead of charging an access fee or tariff, the business model for these ISPs relies on advertising revenue generated by banner ads that are constantly displayed on a user's screen during the time when the user is connected to the service. In many ways, this business model is similar to the business model of commercial broadcast television where the revenue generated by advertisements underwrites the costs of providing the service.

Another offshoot from the services provided by conventional ISPs has been the growth of Application Systems Providers (ASPs) such as applicast.com and usi.net as well as Enhanced or Enterprise Solution Providers (ESPs) such as cwusa.com and hostpro.net. Although there is no clear definition of the precise set of services provided by ASPs and ESPs, the business model is similar to the mainframe service bureau model practiced by Electronic Data Systems and others in which a defined portion of a companies computer processing needs are outsourced to a third party. ASPs and ESPs provide services tailored to meet some, most or all of a customer's needs with respect to application hosting, site development, e-commerce management and server deployment in exchange for a periodic fee. In the context of server deployment, the fees are customarily based on the particular hardware and software configurations that a customer will specify for hosting the customer's applications or web site. As with conventional ISPs, the more powerful the hardware and software and the more support services that are provided, the higher the monthly fee.

Most of the patents to date related to Internet billing and ISPs have focused on providing a secure way of conducting transactions over the Internet by involving the ISP in the payment chain between an e-commerce merchant and a purchaser that is a user of the ISP. Examples of these secured payment systems involving an ISP are shown in U.S. Pat. Nos. 5,794,221, 5,845,267, and 5,899,980. While these kinds of payment systems may be used in a limited capacity, the widespread acceptance of transacting purchases over the Internet using credit card information provided over a secured server link has surpassed most of the need for these kind of systems.

U.S. Pat. No. 5,819,092 describes an online development software tool with fee setting capabilities that allows the developer of a web site, for example, to develop a fee structure for an online service where fees can be levied against both users and third parties in response to logging onto an online service, performing searches or downloading information. U.S. Pat. No. 6,035,281 describes a system for multiparty billing for Internet access where participating parties are allocated a share of the billing based on a predetermined function of the content accessed and the bandwidth used during the access. While there continues to be a subset of Internet access that operates on a "pay-per-view" basis, much of the need for these kind of accounting tools has diminished as the trend is to make the vast majority of information accessed over the Internet available free of such pay-per-view charges.

European Patent Appl. No. 0 844 577 A3 describes a multi-level marketing computer network server where upon the completion of a transaction at the server, the server generates multi-level marketing commission payments due to "participants" in the multi-level marketing program as a result of the sale. While this application describes the use of a network server, the focus of this application is not on the way in which an ISP would be operated, but rather represents the automation of a conventional multi-level marketing arrangement where commissions are paid to a series of individuals within the multi-level marketing organization for each sale.

Although numerous enhancements and improvements have been made in terms of the way that ISPs are managed and many programs and tools have been developed to aid in the operation of ISP networks, the basic way in which ISPs charge for their services has not changed since the Internet become a predominantly commercial network.

SUMMARY OF THE INVENTION

The present invention is a method for operating a commissioned e-commerce service provider that provides services to businesses on a computerized network such as the Internet in exchange for a small commission on the commercial transactions generated using those services. Unlike most ISPs that provide services to individuals and businesses, the commissioned ecommerce service provider preferably provides Internet services for businesses operating web sites or other application that generate e-commerce transactions for the business. Instead of paying a monthly fee for the Internet services required to host a web site or operate and ecommerce site, the business contracts with the commissioned e-commerce service provider to provide these services based on receiving a percentage commission of the commercial transactions generated using these services. The commission percentage is tiered in accordance with the amount of traffic at the site to provide a nominal level of service at a lower commission rate, yet allow for an exceptional volume of traffic to be accommodated by the site at a higher commission rate without having the site fail or the service become overwhelmed. In this way, a business is not locked into a given capacity of service based the specific amount of hardware, for example, that was purchased by their agreement with the ISP. Instead, the commissioned ecommerce service provider allocates servers and resources on an as-needed basis to the web sites and applications of the business in response to the immediate demand for Internet access to those web sites and applications. In addition, it is not necessary for the business to waste scarce financial resources by scaling its service capacity in order to handle a small number of peak access times.

In a preferred embodiment, the base tier of the commission percentage is established in relation to the anticipated or actual average usage of services as measured against the volume of commercial transactions during this average usage. A second tier of the commission percentage is defined at a predetermined increase above the base tier in the event that immediate usage exceeds a first predefined level above the average usage. A third tier of the commission percentage is defined at a predetermined increase above the second tier in the event that immediate usage exceeds a second predefined level above the average usage. Preferably, average usage is a combined measure of the number of simultaneous access requests and the amount of access bandwidth required to satisfy those requests prior to a timeout of the request by a user.

In a preferred embodiment, the CESP is hosted by an Internet engine that is operably connected to the Internet to provide a data center and other related host server management services to Internet account or site customers, who in turn pay a fee for these services that is at least partially based on at least one attribute related to host server services use. A customer benefits from the business method because the commission part of the fee is based on at least one attribute related to host server services usage rather than being a fixed fee charged "by the box" (by the server unit), bandwidth, or square footage of space used. This flexibility allows host server management services to be offered to customers in a manner more analogous to other like services to which the customers are accustomed, or in a manner that can nearly approximate billing methods already used by the host server management services provider or an affiliate. If desirable, for example, a service agreement can be structured according to a customer's unique requirements and billing structure, such as invoicing based on the number of hits, number of connections, number of transactions, revenue from transactions, or a combination of these models. Under this business method, the host server management services provider carries the risk of the services so that the customer can focus on marketing its content. Preferably, the host server management services provider guarantees a certain maximum user level or capability to customers, which the host server management services provider is responsible for meeting regardless of the resources required. This guarantee, incorporated into a service agreement, significantly assists customers such as .coms, B2B emporiums, and service bureaus, among others, in running massive advertising campaigns and to offer advanced services without fearing that they will run out of compute capacity. MP3 sites can offer the latest titles, and DVD sites, for example, can stream titles knowing that sufficient resources will be available to handle peak demands without the need for the customer to oversubscribe to a given number of server boxes as would otherwise be necessary under conventional pricing arrangements for hosted services.

DETAILED DESCRIPTION OF PREFERRED EMBODIMENT

Figure 1:
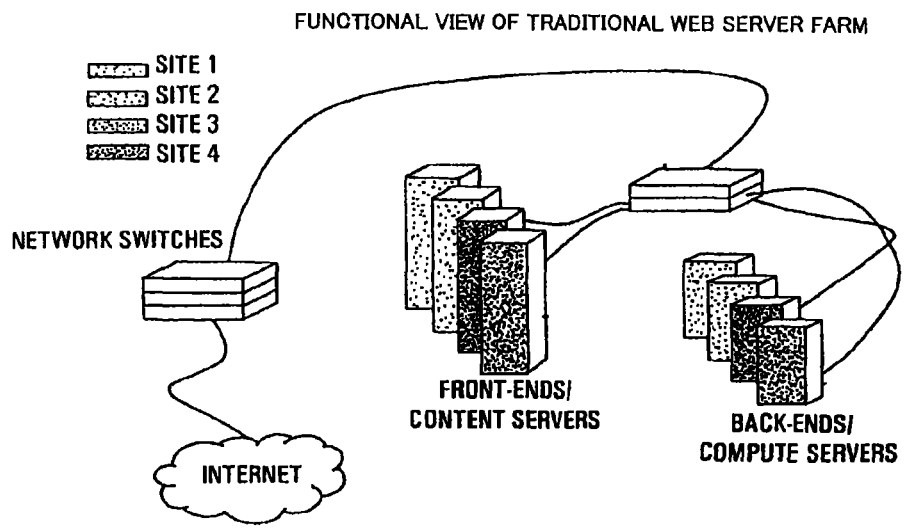
FIG. 1 is a simplified block diagram of a prior art arrangement of a server farm for a hosted service provider.

Referring to FIG. 1, a simplified functional view of an existing server farm 20 for a hosted service provider is shown. Such server farms are normally constructed using off-the-shelf hardware and software components statically configured to support the hosted service requirements of a given customer account. In this embodiment, the server farm 20 for the hosted server provider is supporting hosted services for four different customer accounts. The server farm 20 is connected to the Internet 22 by network switches/routers 24. The network switches 24 are in turn connected to internal network switches/routers 26 that form an intranet among the front-end/content servers 28 and back-end/compute servers 30 for a given customer account. All front-end/content servers 28 and back-end/compute servers 30 are connected to disk systems 32 containing data and software unique to that customer account. Depending upon the physical nature of the hardware for the servers 28, 30, the disk systems 32 may be included within the server housing, or the disk systems 32 may be housed in physically separate units directly connected to each of the servers 28, 30 or attached to more than one server 28, 30 as a storage attached network (SAN) or network attached storage (NAS) configuration.

While this arrangement makes good use of off-the-shelf hardware to construct a server farm 20 that can provide hosted services for multiple independent customer accounts, there are several significant issues exposed in this type of an arrangement. The most significant of these is the generally static nature of the allocation and deployment of system resources among different customer accounts. In order to configure and manage a single customer account within this complex, an administrator for the HSP needs to dedicate some fixed level of system resources (e.g., servers, disks, network links) to the particular customer account based on projected requirements of that customer's needs.

For example, assume a relatively simple website has been designed for any given customer account such that under a projected peak load the customer account may require three front-end servers 28 to handle user requests and a quad processor back-end server 30 to handle database queries/updates generated by these requests. For this type of website, it is likely that hardware-based technology such as F5 Big-IP, Cisco Local Director, or Foundry Serverlron, or a software-based solution such as Windows Load Balance Service (WLBS) or equivalent will be used to distribute the user requests evenly across the front-end/content servers 28. In addition, the back-end database/compute server 30 will commonly be clustered to provide some level of fault tolerance. There are a number of software products available, such as Microsoft Cluster Server, Oracle Parallel Server, etc., that allow websites with multiple servers to ride through hardware failures that might occur during normal operation. In addition, system monitoring tools such as Tivoli Enterprise, HP Open View, etc. allow administrators to be notified when failures are detected within the server farm 20. Although these tools can be adequate for managing the hosted services within a single customer account at a given site, none of these tools allow for the management of hosted services across disparate customer accounts.

Figure 2:
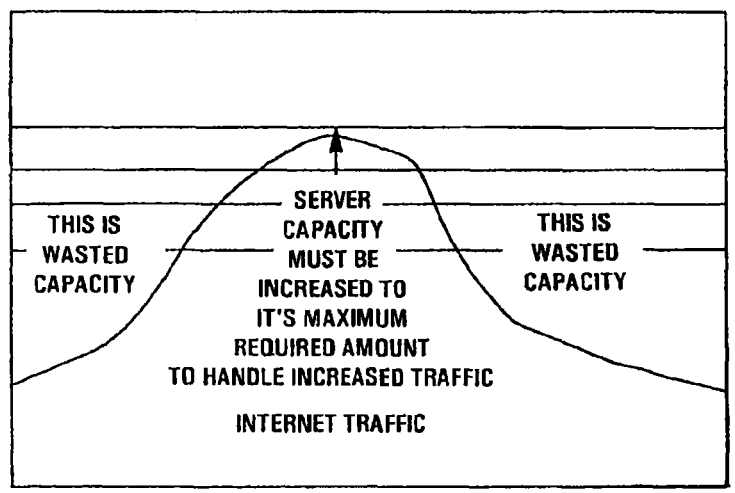
FIG. 2 is a graphic representation of Internet traffic in relation to server capacity for a prior art server farm hosting multiple customer accounts.

In the context of this example, assume that the website for this customer account is an e-commerce site designed to handle a peak load of 5000 transactions per minute. Further, assume that the web sites for the remaining customer accounts in the server farm 20 have been designed to handle peak loads of 10,000, 15,000 and 5000 transactions per minute, respectively. As shown in FIG. 2, having to design and configure each customer account to handle an anticipated peak load likely results in significant wasted capacity within the overall server farm 20. Even though the server farm 20 handling multiple customer accounts may have excess aggregate capacity, this extra capacity cannot be used to respond to hardware failures or unexpected increases in peak load from one account to the next. Resources configured for a particular customer account are dedicated to that account and to that account only. In the event that one of the front-end servers 28 for a first customer account experiences a hardware failure, Web traffic will be routed to the remaining front-end servers 28. If the customer account was busy before the hardware failure and Web traffic remains constant or increases after the failure, the remaining front-end servers 28 will quickly become overloaded by servicing their previous workload as well as the additional traffic redirected from the failed server. In a best case scenario, the system management software for the server farm 20 would notice that a server had failed and send a message to a site manager (via pager and/or e-mail) indicating the server failure. If the site manager receives the message in a timely manner and is located on site, the site manager can physically remove the failed hardware component, install a spare hardware component that has hopefully been stockpiled for this purpose, recable the new hardware component, configure and install the appropriate software for that customer account, and allow the new hardware component to rejoin the remaining front-end servers 28. Hopefully, this process could be accomplished in less than an hour. If the message is not received in a timely manner, if the site manager is not located at the site where the server farm is located, or if there is no stockpiled spare hardware available to replace the failed unit, this process will take even longer. In the meantime, response times for users accessing the customer account are degraded and the customer account becomes increasingly vulnerable to another hardware failure during this period.

In the event that the customer account experiences an increase in demand above the anticipated peak demand for which that customer account has been configured, there are no resources available to the load balancing facilities for redistributing this increased Web traffic. All of the servers 28, 30 would be operating at peak capacity. The result is significantly degraded response times for the customer account and a possibility of "service unavailable" responses for requests that cannot be handled in a timely manner. While the inability to provide services to consumers in a timely manner is an undesirable, but perhaps manageable, problem for a business in other contexts, the additional problem of generating "service unavailable" messages for a website is that, if such messages continue to persist for whatever reason, the Internet may begin to propagate this information to numerous intermediary nodes in the network. As a result, these intermediary nodes will divert subsequent requests to the website due to their understanding that the website is "unavailable". Not only are the consumers who receive the "service unavailable" message not serviced, but many other consumers may never even get to the website once the customer account becomes saturated or overloaded.

Figure 3:
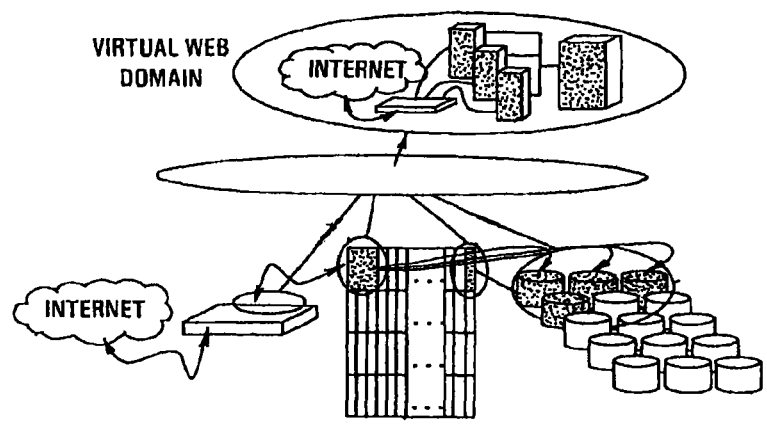
FIG. 3 is a simplified block diagram of the arrangement of a server farm in accordance with the present invention.

Referring now to FIG. 3, a server farm 40 for providing dynamic management of hosted services to multiple customer accounts will be described. As with existing server farms 20, the server farm 40 includes network switches 44 to establish interconnection between the server farm 40 and the Internet 22. Unlike existing server farm 20, however, a population of servers 46 are managed under control of an engine group manager 48. Each of the servers 46 is a stateless computing device that is programmatically connected to the Internet via the network switches 44 and to a disk storage system 50. In one embodiment, the servers 46 are connected to the disk storage system 50 via a Fibre Channel storage area network (SAN). Alternatively, the servers 46 may be connected to the disk storage system 50 via a network attached storage (NAS) arrangement, a switchable crossbar arrangement or any similar interconnection technique.

Figure 4:
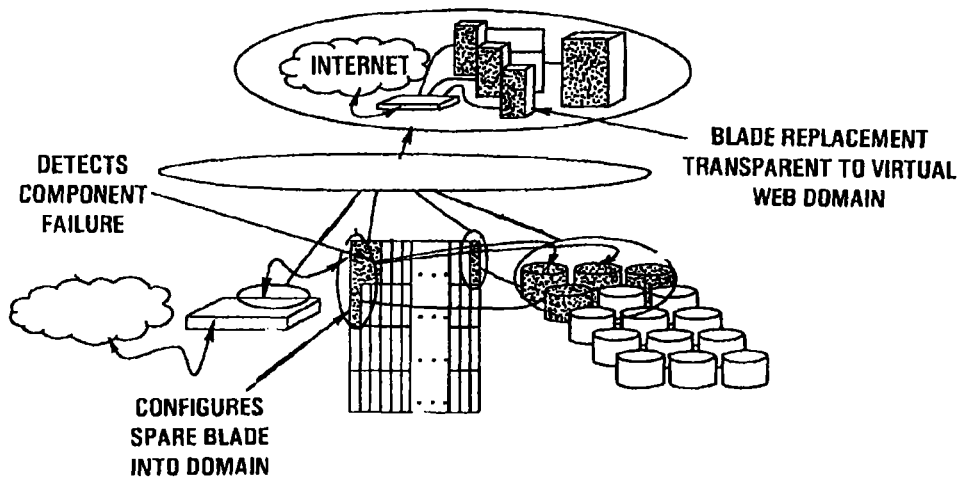
FIG. 4 is a simplified block diagram similar to FIG. 3 showing the dynamic reallocation of servers from a first customer account to a second customer account to address a hardware failure.
Figure 5:
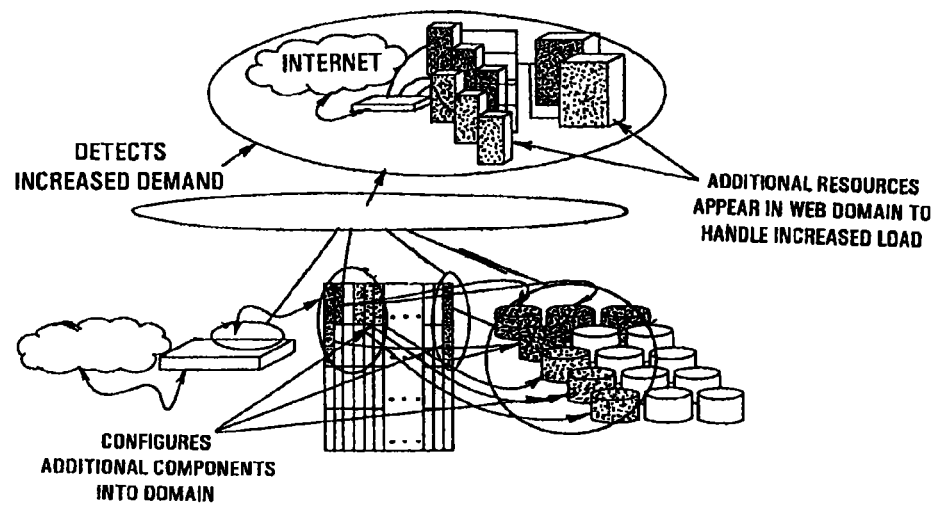
FIG. 5 is a simplified block diagram similar to FIG. 3 showing the dynamic reallocation of servers from a first customer account to a second customer account to address an increased usage demand.

As shown in FIGS. 4 and 5, the engine group manager 48 is responsible for automatically allocating the stateless servers 46 among multiple customer accounts and then configuring those servers for the allocated account. This is done by allocating the servers for a given customer account to a common administrative group 52 defined for that customer account and configured to access software and data unique to that customer account. As will be described, the engine group manager 48 automatically monitors each administrative group and automatically and dynamically reallocates servers 46' from a first administrative group 52-a to a second administrative group 52-b in response to the automatic monitoring. This is accomplished by using the engine group manager 48 to set initialization pointers for the reallocated servers 46' from the first administrative group 52-a to access software and data unique to the customer account for the second administrative group 52-b, and then reinitializing the reallocated servers 46' such that reallocated servers 46' join the second administrative group 52-b. Unlike the existing process for adding are removing hardware resources to a server farm 20, the present invention can make a reallocated server 46' available to a new administrative group 52 in as little as a few minutes. Basically, the only significant time required to bring the reallocated server 46' online will be the time required to reboot the server 46' and any time required for the load-balancing and/or clustering software to recognize this rebooted server. It will be understood that load-balancing software is more typically found in connection with front-end/content servers, whereas clustering software or a combination of clustering software and load-balancing software are more typically used in connection with back-end/compute servers. The term load-balancing software will be used to refer to any of these possible combinations.

In one embodiment, the reallocated servers 46' automatically join the second administrative group because the software for the second administrative group 52-b includes load-balancing software that will automatically add or remove a server from that administrative group in response to the server being brought online (i.e. reset and powered on) or brought offline (i.e., reset and powered off). As previously described, this kind of load-balancing software is widely known and available today; however, existing load-balancing software is only capable of adding or removing servers from a single administrative group. In this embodiment, the engine group manager 48 takes advantage of capabilities of currently available commercial load-balancing application software to allow for the dynamic reallocation servers 46' across different administrative groups 52. Alternatively, agents or subroutines within the operating system software for the single administrative group could be responsible for integrating a reallocated server 46' into the second administrative group 52-b once the reallocated server 46' is brought online. In still another embodiment, the engine group manager 48 could publish updates to a listing of available servers for each administrative group 52.

Preferably, the engine group manager 48 will set pointers in each of the servers 46 for an administrative group 52 to an appropriate copy of the boot image software and configuration 10 files, including operating system an application programs, that had been established for that administrative group 52. When a reallocated server 46' is rebooted, its pointers have been reset by the engine group manager 48 to point to the boot image software and configuration files for the second administrative group 52-b, instead of the boot image software and configuration files for the first administrative group 52-a.

In general, each administrative group 52 represents the website or similar hosted services being provided by the server farm 40 for a unique customer account. Although different customer accounts could be paid for by the same business or by a related commercial entity, it will be understood that the data and software associated with a given customer account, and therefore with a given administrative group 52, will be unique to that customer account. Unlike 20 service providers which utilize large mainframe computer installations to provide hosted services to multiple customers by using a single common operating system to implement time-sharing of the resources of the large mainframe computer system, each administrative group 52 consists of unique software, including conventional operating system software, that does not extend outside servers 46 which have been assigned to the administrative group 52. This distributed approach 25 of the present invention allows for the use of simpler, conventional software applications and operating systems that can be installed on relatively inexpensive, individual servers. In this way, the individual elements that make up an administrative group 52 can be comprised of relatively inexpensive commercially available hardware servers and standard software programs.

Figure 6:
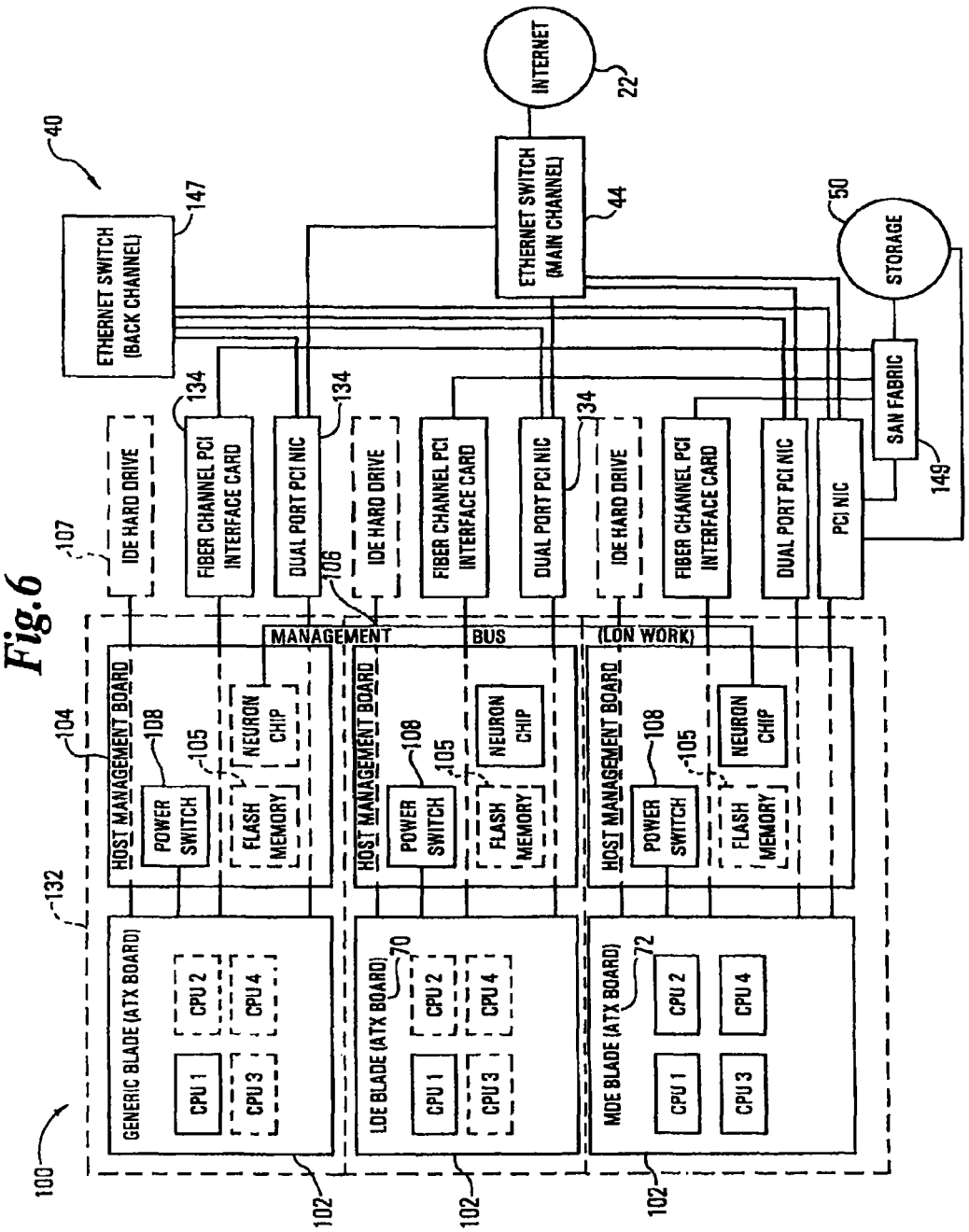
FIG. 6 is a block diagram of a preferred embodiment of the components of a server farm in accordance with the present invention.
Figure 7:
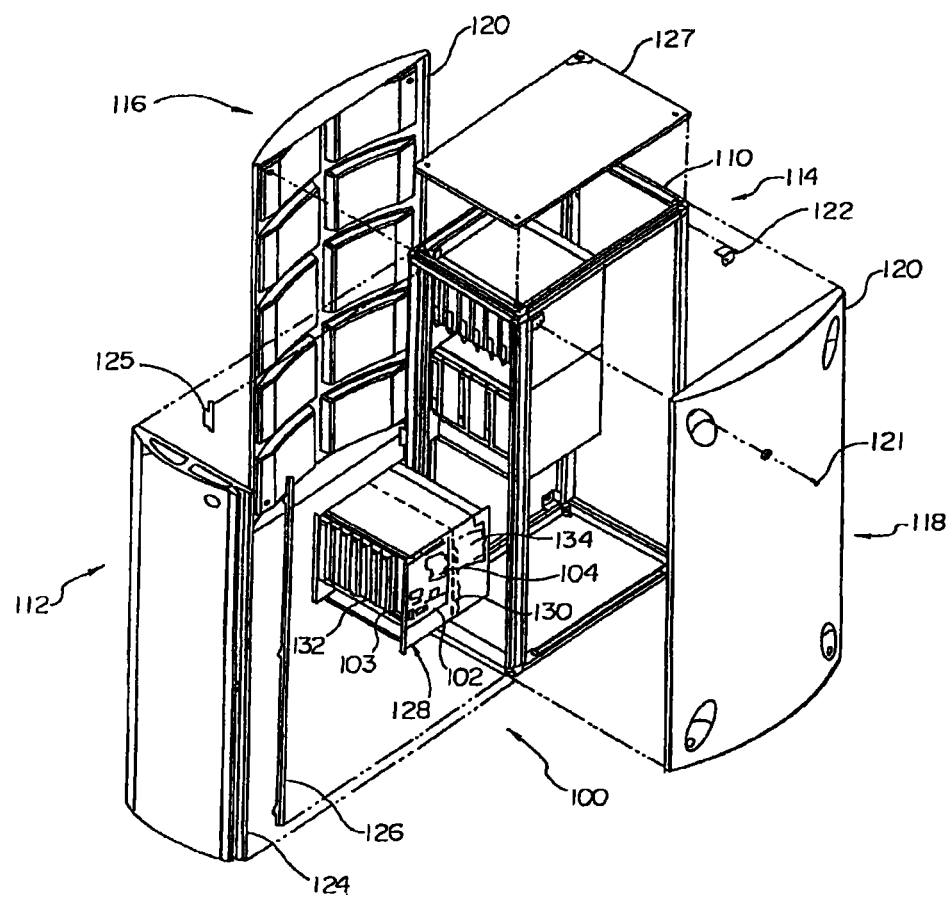
FIG. 7 is an exploded perspective view of a preferred embodiment of the hardware for the server farm in accordance with the present invention.

FIGS. 6 and 7 show a preferred embodiment of the components and hardware for the server farm 40 in accordance with the present invention. Although the preferred embodiment of the present invention is described with respect to this hardware, it will be understood that the concept of the present invention is equally applicable to a server farm implemented using all conventional servers, including the currently available 1U or 2U packaged servers, if those servers are provided with the host management circuitry or its equivalent as will be described.

Preferably, the hardware for the server farm 40 is a scalable engine 100 comprised of a large number of commercially available server boards 102 each arranged as an engine blade 132 in a power and space efficient cabinet 110. The engine blades 132 are removably positioned in a front side 112 of the cabinet 110 in a vertical orientation. A through plane 130 in the middle of the cabinet 110 provides common power and controls peripheral signals to all engine blades 132. I/O signals for each engine blade 132 are routed through apertures in the through plane 130 to interface cards 134 positioned in the rear of the cabinet 110. The I/O signals will be routed through an appropriate interface card 134 either to the Internet 22 via the network switch 44, or to the disk storage 50. Preferably, separate interface cards 134 are used for these different communication paths.

The scalable engine can accommodate different types of server boards 102 in the same cabinet 110 because of a common blade carrier structure 103. Different types of commercially available motherboards 102 are mounted in the common blade carrier structure 103 that provides a uniform mechanical interface to the cabinet 110. A specially designed PCI host board 104 that can plug into various types of motherboards 102 has connections routed through the through plane 130 for connecting to the interface cards 134. Redundant hot-swappable high-efficiency power supplies 144 are connected to the common power signals on the through plane 130. The host board 104 includes management circuitry that distributes the power signals to the server board 102 for that engine blade 132 by emulating the ATX power management protocol. Replaceable fan trays 140 are mounted below the engine blades 132 to cool the engine 100. Preferably, the cabinet 110 accommodates multiple rows of engine blades 132 in a chassis assembly 128 that includes a pair of sub-chassis 129 stacked on top of each other and positioned on top of a power frame 146 that holds the power supplies 144. Preferably, the cabinet 110 will also include rack mounted Ethernet networks switches 44 and 147 and storage switches 149 attached to disk drives 50 over a Fibre Channel network. For a more detailed description of the scalable engine 100 of the preferred embodiment of the present invention, reference is made to the previously-identified, co-pending application entitled "Scalable Internet Engine," the disclosure of which is hereby incorporated by reference.

It will also be understood that while the present invention is described with respect to single cabinet 110 housing engine blades 132 with server boards 102 that together with the appropriate application software constitute the various servers 46 that are assigned to a first administrative group 52-a, and a second administrative group 52-b each having at least two engine blades 132, the server farm 40 can accommodate administrative groups 52 for any number of customers depending upon the total number of servers 46 in the server farm 40. Preferably, multiple cabinets 110 can be integrated together to scale the total number of servers 46 at a given location. As will be discussed, it is also possible to link multiple cabinets 110 in geographically disparate locations together as part of a single server farm 40 operating under control of the engine group manager 48.

In the preferred embodiment, the server boards 102 of each engine blade 132 can be populated with the most recent processors for Intel, SP ARC or PowerPC designs, each of which can support standard operating system environments such as Windows NT, Windows 2000, Linux or Solaris. Each engine blade 132 can accommodate one or more server boards 102, and each server board may be either a single or multiprocessor design in accordance with the current ATX form factor or a new form factor that may be embraced by the industry in the future. Preferably, the communication channel 106 is implemented a Controller Area Network (CAN) bus that is separate from the communication paths for the network switch 44 or storage switches 149. Optionally, a second fault backup communication channel 106' could be provided to allow for fault tolerance and redundant communication paths for the group manager software 48.

In a conventional server, the pointers and startup configuration information would be set by manual switches on the server board or hardcoded into PROM chip sets on the server board or stored at fixed locations on a local hard drive accessible by the server board. The management circuitry on the host board 104 is designed to have appropriate hooks into the server board 102 such that the pointers and other startup configuration information are actually supplied by the host management circuitry. Optionally, an engine blade 132 can include a local hard drive 107 that is accessed through the host board 104 such that information stored on that local hard drive 107 can be configured by the host board via the communication channel 106. Additionally, the host board 104 preferably includes power management circuitry 108 that enables the use of common power supplies for the cabinet 110 by emulating the ATX power management sequence to control the application of power to the server board 102. Preferably, a back channel Ethernet switch 147 also allows for communication of application and data information among the various server boards 102 within the server farm 40 without the need to route those communications out over the Internet 22.

In a preferred embodiment, each cabinet 110 can house up to 32 engine blades 132. In this configuration, the networks switches 44 and 147 could comprise two 32 circuit switched Ethernet network routers from Foundry. Preferably, the networks switches 44 and 147 allow a reconfiguration of the connection between a server 46 and the networks switch 44 and 147 to be dynamically adjusted by changing the IP address for the server. With respect to the disk storage units 50, two options are available. First, unique hardware and software can be inserted in the form of a crossbar switch 149 between the engine blades 132 and the disk storage units 50 which would abstract way the details of the underlying SAN storage hardware configuration. In this case, the link between the disk storage units 50 and each blade 132 would be communicated to the crossbar switch 149 through set of software APIs. Alternatively, commercially available Fibre Channel switches or RAID storage boxes could be used to build connectivity dynamically between the blades 132 and disk storage units 50. In both alternatives, a layer of software inside the engine group manager 48 performs the necessary configuration adjustments to the connections between the server blades 132 and networks switches 147 and disk storage units 50 are accomplished. In another embodiment, a portion of the servers 46 could be permanently cabled to the network switches or disk storage units to decrease switch costs if, for example, the set of customer accounts supported by a given portion of the server farm 40 will always include a base number of servers 46 that cannot be reallocated. In this case, the base number of servers 46 for each administrative group 52 could be permanently cabled to the associated network switch 149 and disk storage unit 50 for that administrative group 52.

Referring again to FIGS. 4 and 5, it will be seen that the server farm system 40 of the present invention can dynamically manage hosted services provided to multiple customer accounts. It will be seen that there are at least five servers 46 operably connected to an intranet 54. Preferably, the intranet is formed over the same network switches 44 that interconnect the servers 46 with the Internet 22 or over similar network switches such as network switches 147 that interconnect the servers 46 to each other. Each server 46 has management circuitry on the host board 104 that provides a communication channel 106 with at least one of the other servers 46 that is separate from the intranet 54 created by the network switches 44 and/or 147.

At least four of the servers 46 are configured to execute a local decision software program 70 that monitors the server 46 and communicate status information across the communication channel 106. At least two of these servers 46 are allocated to a first administrative group 52-a for a first customer account and configured to access software and data unique to the first customer account to provide hosted services to the Internet for that customer account. At least another two of the servers 46 are allocated to a second administrative group 52-b for a second customer account and configured to access software and data unique to the second customer account to provide hosted services to the Internet for that customer account. At least one of the servers 46 executes a master decision software program 72 that collects status information from the local decision software programs 70 executing on the other servers 46. In one embodiment, a pair of servers 46 are slaved together using fault tolerant coordination software to form a fault tolerant/redundant processing platform for the master decision software program. As will be described, the master decision software program 72 dynamically reallocates at least one server 46' from the first administrative group 52-a to the second administrative group 52-b in response to at least the status information collected from the local decision software programs 70.

The servers 46 for both administrative groups 52 can be arranged in any configuration specified for a given customer account. As shown in FIG. 3, three of the servers 46 for administrative group 52-b are configured as front-end servers with a single server 46 being configured as the back-end/compute server for this customer account. In response to a significant increase in the peak usage activity for the customer account for the second administrative group 52-b, the master decision software program 72 determines that is necessary to reallocate server 46' from its current usage as a server for the first administrative group 52-a to being used as a back-end/compute server for the second administrative group 52-b. The preferred embodiment for how this decision is arrived will be described in connection with the description of the operation of the local decision software program 72. Following the procedure just described, the master decision software program 72 directs the dynamic reallocation of reallocated server 46' to the second administrative group 52-b as shown in FIG. 4.

Although the preferred embodiment of present invention is described in terms of reallocation of a server 46' from a first administrative group 52-a to a second administrative group 52-b, it should be understood that the present invention can also be implemented to provide for a common pool of available servers 46' that are not currently assigned to a given administrative group 52 and may be reallocated without necessarily requiring that they be withdrawn from a working administrative group 52. For example, a server farm 40 having thirty-two servers 46 could be set up to allocate six servers to each of four different customer accounts, with one server 46 executing the master decision software program 72 and a remaining pool 56 of seven servers 46 that are initially unassigned and can be allocated to any of the four administrative groups 52 defined for that server farm. Because the assignment of servers to administrative groups is dynamic during the ongoing operation of the server farm 40 in accordance with the present invention, the preferred embodiment of the present invention uses this pool 56 as a buffer to further reduce the time required to bring a reallocated server 46' into 30 an administrative group 52 by eliminating the need to first remove the reallocated server 46' from its existing administrative group 52. In one embodiment, the pool 56 can have both warm servers and cold servers. A warm server would be a server 46 that has already been configured for a particular administrative group 52 and therefore it is not necessary to reboot that warm server to allow it to join the administrative group. A cold server would be a server that is not configured to a particular administrative group 52 and therefore it will be necessary to reboot that cold server in order for it to join the administrative group. It should also be understood that reallocated servers 46' can be allocated to a new administrative group singly or as a group with more than one reallocated server 46' being simultaneously reallocated from a first administrative group 52-a to a second administrative group 52-b. In the context of how the network switches 44, 147 and storage switches 149 are configured to accommodate such dynamic reallocation, it should also be understood that multiple servers 46 may be reallocated together as a group if it is necessary or desirable to reduce the number of dynamically configurable ports on the network 44, 147 and/or storage switches 149. One of the significant advantages of the present invention is that the process of reconfiguring servers from one administrative group 52-a to a second administrative group 52-b will wipe clean all of the state associated with a particular customer account for the first administrative group from the reallocated server 46' before that server is brought into service as part of the second administrative group 52-b. This provides a natural and very efficient security mechanism for precluding intentional or unintentional access to data between different customer accounts. Unless a server 46 or 46' is a member of a given administrative group 52-a, there is no way for that server to have access to the data or information for a different administrative group 52-b. Instead of the complex and potentially problematic software security features that must be implemented in a mainframe server or other larger server system that utilizes a shard memory space and/or common operating system to provide hosted services across different customer accounts, the present invention keeps the advantages of the simple physical separation between customer accounts that is found in conventional server farm arrangements, but does this while still allowing hardware to be automatically and dynamically reconfigured in the event of a need or opportunity to make better usage of that hardware.

The only point of access for authorization and control of this reconfiguration is via the master decision software program 72 over the out-of-band communication channel 106.

Figure 14:
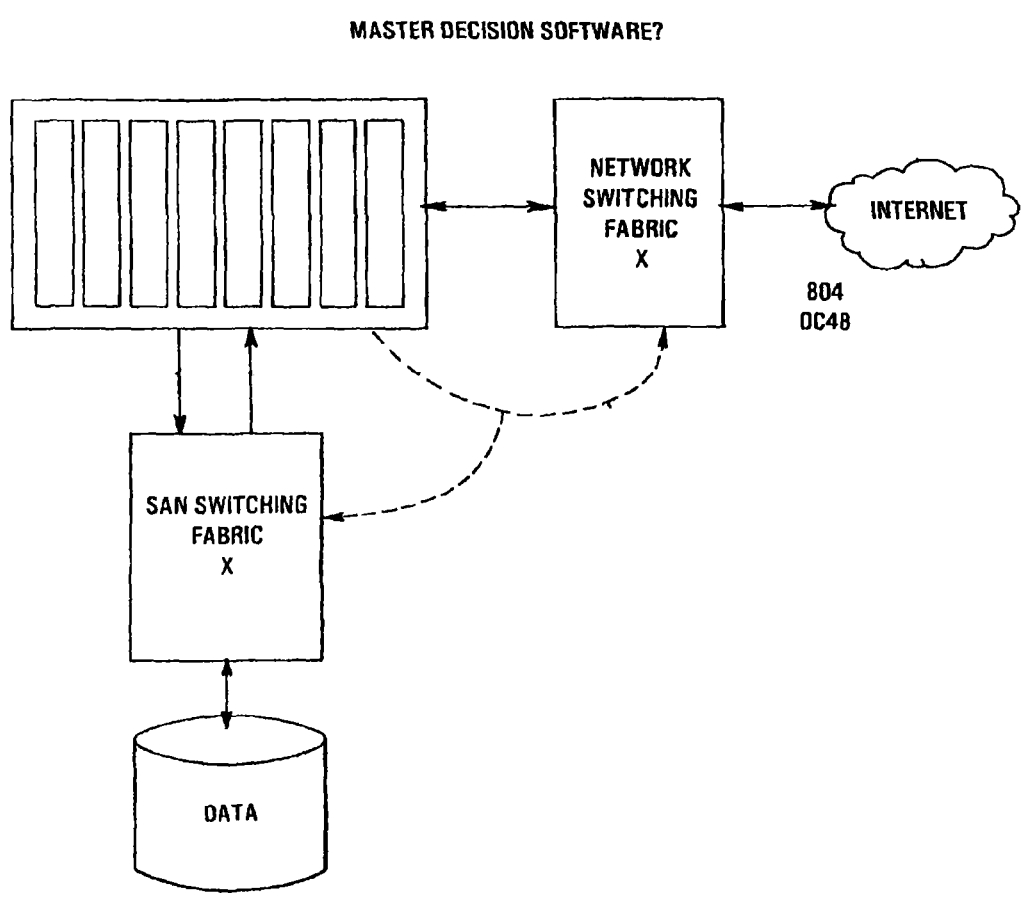
FIG. 14 is a block diagram showing the master decision software program controlling the network switch and storage unit connections.

As shown in FIG. 14, preferably each server 46 is programmatically connected to the Internet 22 under control of the master decision software program 72. The master decision software program 72 also switches the reallocated server 46' to be operably connected to a portion of the disk storage unit storing software and data unique to the customer account of the second administrative group. The use of an out-of-band communication channel 106 separate from the intranet 54 over the network switches 44 for communicating at least a portion of the status information utilized by the master decision software program 72 is preferably done for reasons of security, fault isolation and bandwidth isolation. In a preferred embodiment, the communication channel 106 is a serial Controller Area Network (CAN) bus operating at a bandwidth of 1 Mb/s within the cabinet 106, with a secondary backbone also operating at a bandwidth 1 Mb/s between different cabinets 106. It will be understood that a separate intranet with communications using Internet Protocol (IP) protocol could be used for the communication channel 106 instead of a serial management interface such as the CAN bus, although such an embodiment would effectively be over designed for the level and complexity of communications that are required of the communication channel 106 connected to the host boards 104. While it would be possible to implement the communication channel 106 as part of the intranet 54, such an implementation is not preferred because of reasons of security, fault isolation and bandwidth isolation.

Figure 8:
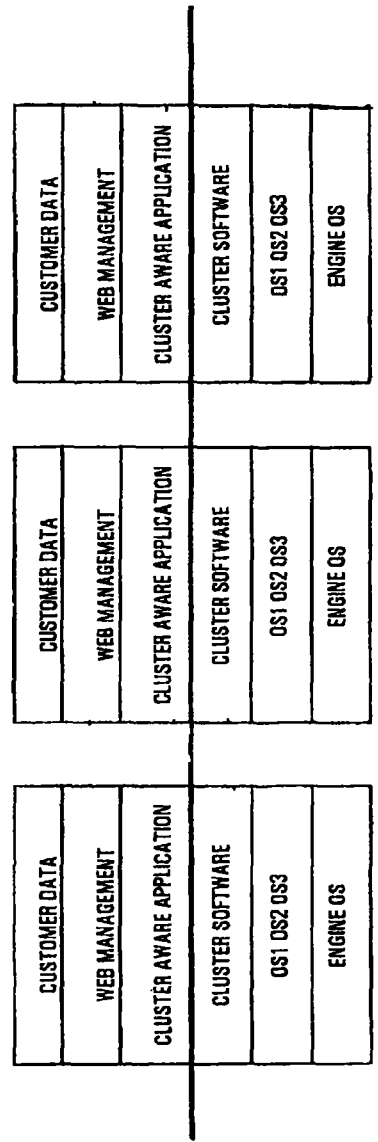
FIG. 8 is a block diagram showing the hierarchical relation of the various software layers utilized by the present invention for a given customer account.

FIG. 8 shows a block diagram of the hierarchical relation of one embodiment of the various data and software layers utilized by the present invention for a given customer account. Customer data and databases 60 form the base layer of this hierarchy. Optionally, a web data management software layer 62 may be incorporated to manage the customer data 60 across multiple instances of storage units that comprise the storage system 50. Cluster and/or load balancing aware application software 64 comprises the top layer of what is conventionally thought of as the software and data for the customer's website. Load-balancing software 66 groups multiple servers 46 together as part of the common administrative group 52. Multiple instances of conventional operating system software 68 are present, one for each server 46. Alternatively, the load-balancing software 66 and operating system software 68 may be integrated as part of a common software package within a single administrative group 52. For a more detailed description of one embodiment of a load balancing system that may be utilized, reference is made to the previously-identified, co-pending application entitled "System for Distributing Requests Across Multiple Servers Using Dynamic Metrics," the disclosure of which is hereby incorporated by reference. Above the conventional operating system software 68 is the engine operating software 48 of the present invention that manages resources across multiple customer accounts 52-a and 52-b.

Figure 9:
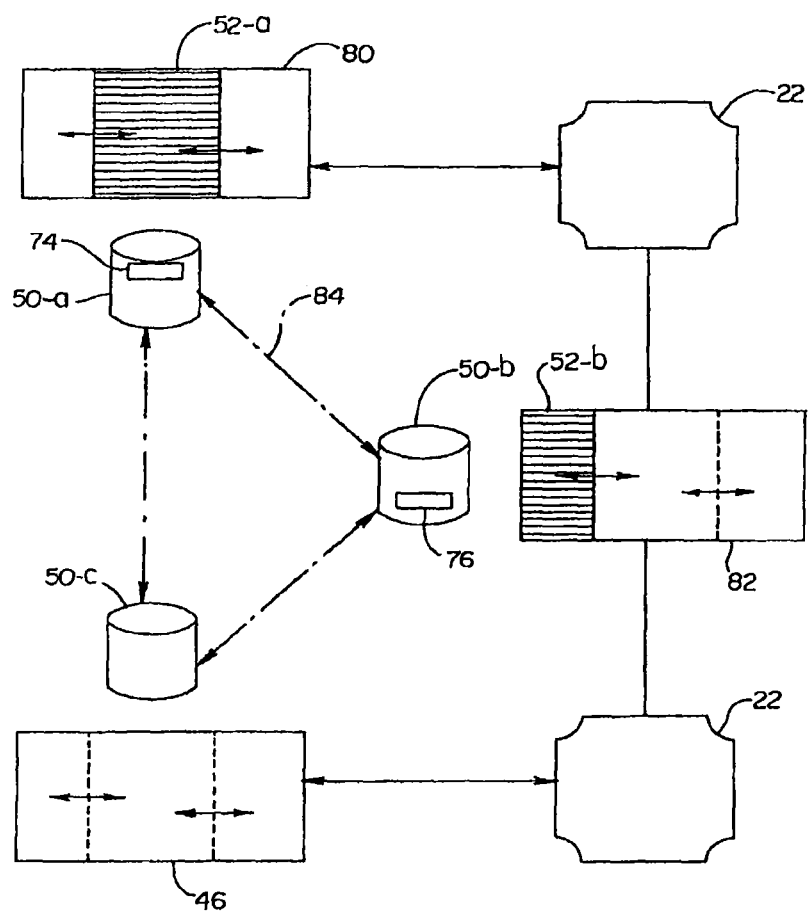
FIG. 9 is a block diagram of an embodiment of the present invention implemented across geographically disparate sites.

In one embodiment of the present invention as shown in FIG. 9 the servers 46 assigned to the first administrative group 52-a are located at a first site 80 and the servers 46 assigned to the second administrative group 52-b are located at a second site 82 geographically remote from the first site 80. In this embodiment, the system further includes an arrangement for automatically replicating at least data for the first administrative group 52-a to the second site 82. In a preferred embodiment, a communication channel 84 separate from the network switches 44 is used to replicate data from the disk storage units 50-a at the first site 80 to the disk storage units 50-b at the second site 82. The purpose of this arrangement is twofold. First, replication of the data provides redundancy and backup protection that allows for disaster recovery in the event of a disaster at the first site 80. Second, replication of the data at the second site 82 allows the present invention to include the servers 46 located in the second site 82 in the pool of available servers which the master decision software program 72 may use to satisfy increased demand for the hosted services of the first customer by dynamically reallocating these servers to the first administrative group 52-a.

The coordination between master decision software programs 72 at the first site 80 and second site 82 is preferably accomplished by the use of a global decision software routine 86 that 10 communicates with the master decision software program 72 at each site. This modular arrangement allows the master decision software programs 72 to focus on managing the server resources at a given site and extends the concept of having each site 80, 82 request additional off-site services from the global decision software routine 86 or offer to make available off-site services in much the same way that the local decision software programs 70 make requests for additional servers or make servers available for reallocation to the master decision software program 70 at a given site.

Preferably, the multi-site embodiment of the present invention utilizes commercially available SAN or NAS storage networking software to implement a two-tiered data redundancy and replication hierarchy. As shown in FIG. 9, the working version 74 of the customer data for the first customer account customer is maintained on the disk storage unit 50 at the first site 80. Redundancy data protection, such as data mirroring, data shadowing or RAID data protection is used to establish a backup version 76 of the customer data for the first customer account at the first site 80. The networking software utilizes the communication channel 84 to generate a second backup version 78 of the customer data for the first customer account located at the second site 82. The use of a communication channel 84 that is separate from the connection of the networks switches 44 to the Internet 22 preferably allows for redundant communication paths and minimizes the impact of the background communication activity necessary to generate the second backup version 78. Alternatively, the backup version 78 of the customer data for the first customer account located at the second site 82 could be routed through the network switches 44 and the Internet 22. In another embodiment, additional backup versions of the customer data could be replicated at additional site locations to further expand the capability of the system to dynamically reallocate servers from customer accounts that are underutilizing these resources to customer accounts in need of these resources.

Figure 10:
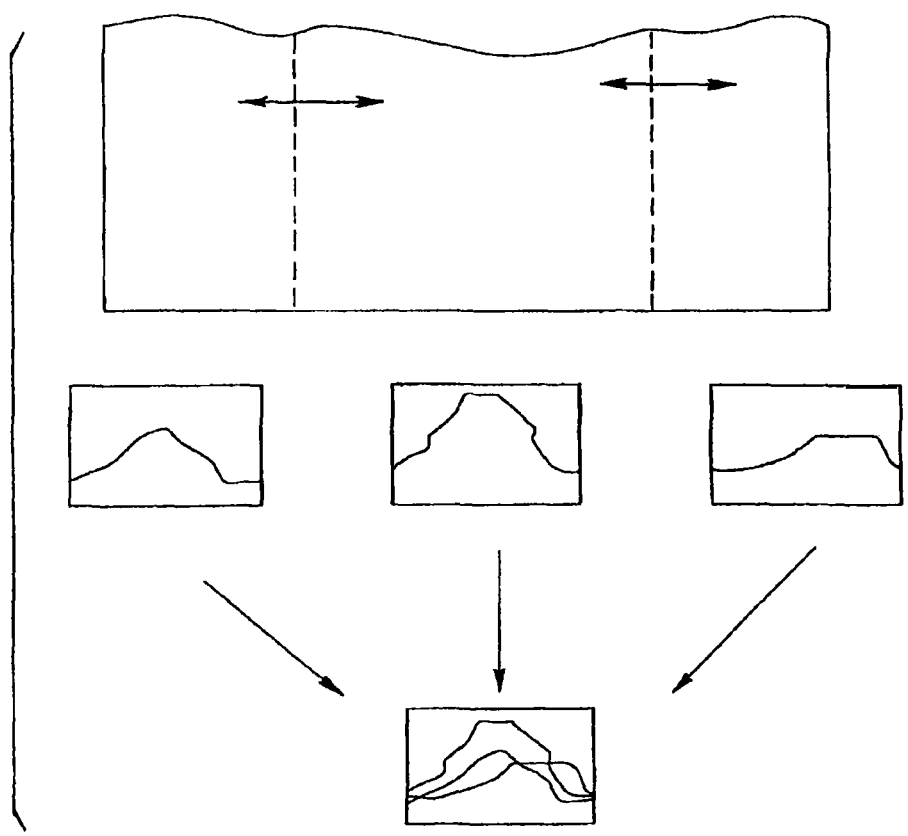
FIG. 10 is a graphic representation of Internet traffic in relation to server capacity for the server farm of the present invention when hosting multiple customer accounts.

As shown in FIG. 10, the ability of the present invention to dynamically reallocate servers from customer accounts that are underutilizing these resources to customer accounts in need of these resources allows for the resources of the server farm 40 to be used more efficiently in providing hosted services to multiple customer accounts. For each of the customer accounts 91, 92, 93, 94 and 95, the overall allocation of servers 46 to each customer account is accomplished such that a relatively constant marginal overcapacity bandwidth is maintained for each customer account. Unlike existing server farms, where changes in hardware resources allocated to a given customer account happen in terms of hours, days or weeks, the present invention allows for up-to-the-minute changes in server resources that are dynamically allocated on an as needed basis. FIG. 10 also shows the advantages of utilizing multiple geographically distinct sites for locating portions of the server farm 40. It can be seen that the peak usages for customer accounts 94 and 95 are time shifted from those of the other customer accounts 91, 92 and 93 due to the difference in time zones between site location 80 and site location 82. The present invention can take advantage of these time shifted differences in peak usages to allocate rolling server capacity to site locations during a time period of peak usage from other site locations which are experiencing a lull in activity.

Figure 13:
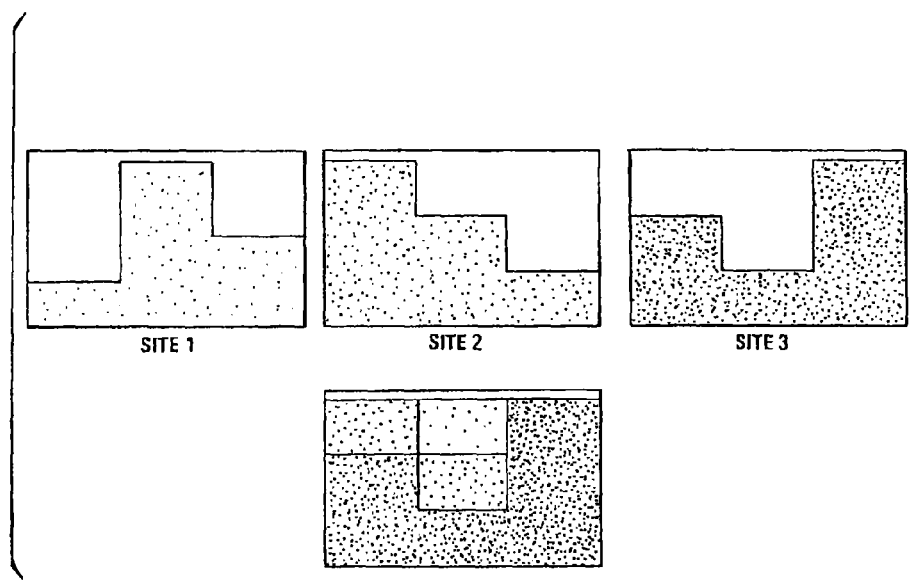
FIG. 13 is a graphic representation of Internet traffic in relation to server capacity for a multi-site embodiment of the present invention.

In one embodiment of the multi-site configuration of the present invention as shown in FIG. 13, at least three separate three separate site locations 80, 82 and 84 are preferably situated geographically at least 24 divided by N+1 hours apart from each other, where N represents the number of distinct site locations in the multi-site configuration. In the embodiment having three separate site locations 80, 82 and 84, the site locations are preferably eight hours apart from each other. The time difference realized by this geographic separation allows for the usage patterns of customer accounts located at all three sites to be aggregated and serviced by a combined number of servers that is significantly less than would otherwise be required if each of the servers at a given location were not able to utilize servers dynamically reallocated from one or more of the other locations. The advantage of this can be seen when site location 80 is experiencing nighttime usage levels, servers from this site location 80 can be dynamically reallocated to site location 82 that is experiencing daytime usage levels. At the same time, site location 84 experiences evening usage levels and mayor may not be suited to have servers reallocated from this location to another location or vice versa. Generally, a site location is arranged so as to look to borrow capacity first from a site location that is at a later time zone (i.e., to the east of that site) and will look to make extra capacity available to site locations that are at an earlier time zone (i.e., to the west of that site). Other preferences can also be established depending upon past usage and predicted patterns of use.

Figure 11:
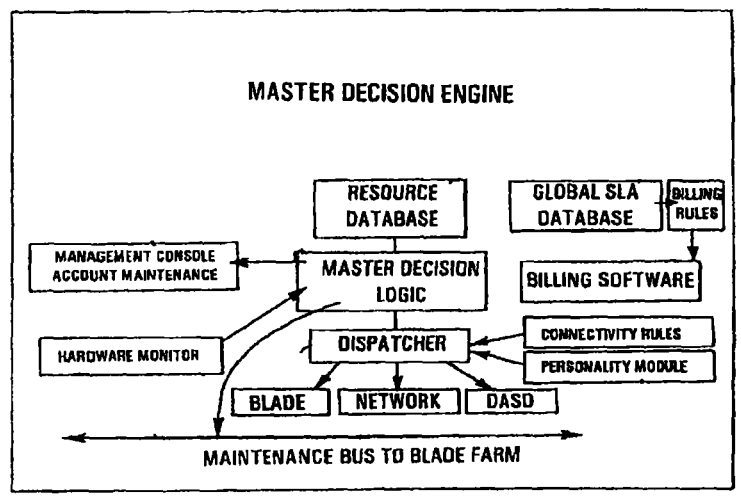
FIG. 11 is a block diagram showing a preferred embodiment of the master decision software program of the present invention.

Referring now to FIG. 11, a preferred embodiment of the master decision software program 72 will be described. The master decision software program 72 includes a resource database 150, a service level agreement database 152, a master decision logic module 154 and a dispatch module 156. The master decision logic module 154 has access to the resource database 150 and the service level agreement database 152 and compares the status information to information in the resource database 150 and the service level agreement database 152 to determine whether to dynamically reallocate servers from the first customer account to the second customer account. The dispatch module 156 is operably linked to the master decision logic module 154 to dynamically reallocate servers when directed by the master decision logic module 154 by using the communication channel 106 to set initialization pointers for the reallocated servers 46' to access software and data unique to the customer account for the second administrative group 52-*b* and reinitializing the reallocated server 46' such that at least one server joins the second administrative group 52-*b*. Preferably, the dispatch module 156 includes a set of connectivity rules 160 and a set of personality modules 162 for each server 46. The connectivity rules 160 providing instructions for connecting a particular server 46 to a given network switch 44 or data storage unit 50. The personality module 162 describes the details of the particular software configuration of the server board 102 to be added to an administrative work group for a customer account. Once the dispatch module 146 has determined the need to reallocate a server, it will evaluate the set of connectivity rules 160 and a set of personality modules 162 to determine how to construct a server 46 that will be dispatched to that particular administrative group 52. Another way of looking at how the present invention can dynamically provide hosted service across disparate accounts is to view a portion of the servers 46 as being assigned to a pool of a plurality of virtual servers that may be selectively configured to access software and data for a particular administrative group 52. When the dispatch module 146 has determined a need to add a server 46 to a particular administrative group 52, it automatically allocates one of the servers from the pool of virtual servers to that administrative group. Conversely, if the dispatch module determines that an administrative group can relinquish one of its servers 46, that relinquished server would be added to the pool of virtual servers that are available for reallocation to a different administrative group. When the present invention is viewed from this perspective, it will be seen that the group manager software 48 operates to "manufacture" or create one or more virtual servers out of this pool of the plurality of virtual servers on a just-in-time or as-needed basis. As previously described, the pool of virtual servers can either be a warm pool or a cold pool, or any combination thereof. The virtual server is manufactured or constructed to be utilized by the desired administrative group in accordance with the set of connectivity rules 160 and personality modules 162.

In this embodiment, the master decision logic module 152 is operably connected to a management console 158 that can display information about the master decision software program and accept account maintenance and update information to processes into the various databases. A billing software module 160 is integrated into the engine group manager 48 in order to keep track of the billing based on the allocation of servers to a given customer account. Preferably, a customer account is billed a higher rate at a higher rate for the hosted services when servers are dynamically reallocated to that customer account based on the customer's service level agreement.

Figure 12:
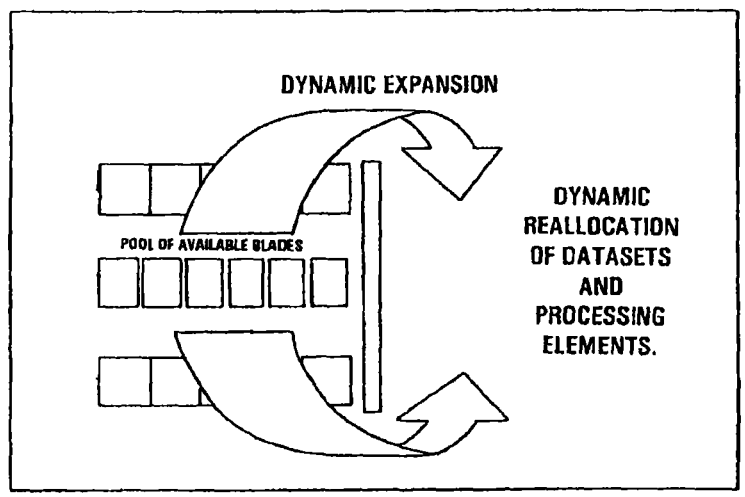
FIG. 12 is a graphic representation of three different service level agreement arrangements for a given customer account.

FIG. 12 shows a representation of three different service level agreement arrangements for a given customer account. In this embodiment, the service level agreements are made for providing hosted services for a given period of time, such as a month. In a first level shown at 170, the customer account is provided with the capacity to support hosted services for 640,000 simultaneous connections. If the customer account did not need a reallocation of servers to support capacity greater than the committed capacity for the first level 170, the customer would be charged to establish rate for that level of committed capacity. In a second level shown at 172, customer account can be dynamically expanded to support capacity of double the capacity at the first level 172. In a preferred embodiment, once the engine group manager 48 has dynamically reallocated servers to the customer account in order to support the second level 172 of capacity to meet a higher than anticipated peak usage, the customer account would be charged a higher rate for the period of time that the additional usage was required. In addition, the customer account could be charged a one-time fee for initiating the higher level of service represented by the second level 172. In one embodiment, charges for the second level 172 of service would be incurred at a rate that is some additional multiple of the rate charged for the first level 170. The second level 172 represents a guaranteed expansion level available to the customer for the given period of time. Finally, a third level 174 provides an optional extended additional level of service that may be able to be brought to bare to provide hosted services for the customer account. In this embodiment, the third level 174 provides up to a higher multiple times the level of service as the first level 170. In one embodiment in order to provide this extended additional level of service, the host system makes use of the multi-site arrangement as previously described in order to bring in the required number of servers to meet this level of service. Preferably, the customer account is charged a second higher rate for the period of time that the extended additional service is reallocated to this customer account. In one embodiment, charges for the third level 174 of service would be incurred at a rate that is an even larger multiple of the first level 170 for the given period of time that the extended additional third level 174 of service is provided for this customer account. Again, the customer account may be charged a one-time fee for initiating this third level 174 of service at any time during the given period. At the end of a given period, the customer may alter the level of service contracted for the given customer account.

As shown in FIG. 12, the service level agreement is increased by 50 percent from a first period to a second period in response to a higher anticipated peak usage for the given customer account. Preferably, the period for a service level agreement for a given customer account would be a monthly basis, with suggestions been presented to the customer for recommended changes to the service level agreement for the upcoming billing period. Although this example is demonstrated in terms of simultaneous connections, it should be understood that the service level agreement for given customer account can be generated in terms of a variety of performance measurements, such as simultaneous connections, hits, amount of data transferred, number of transactions, connect time, resources utilized by different application software programs, the revenue generated, or any combination thereof. It will also be understood that the service level agreement may provide for different levels of commitment for different types of resources, such as front-end servers, back-end servers, network connections or disk storage units.

Figure 15:
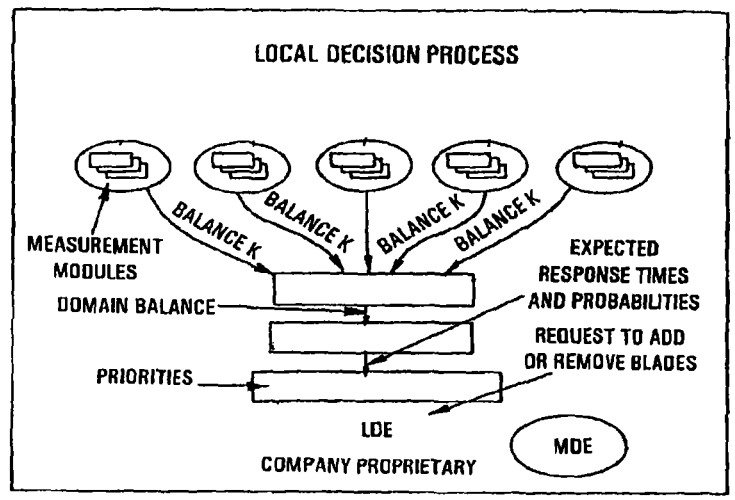
FIG. 15 is a block diagram of the preferred embodiment of the local decision software program.

Referring now to FIG. 15, a block diagram of the preferred embodiment of the local decision software program 70 will be described. A series of measurement modules 180,181,182, 183 and 184 each performed independent evaluations of the operation of the particular server on which the local decision software program 70 is executing. Outputs from these measurement modules are provided to an aggregator module 190 of the local decision software program 70. A predictor module 192 generates expected response times and probabilities for various requests. With priority inputs 194 supplied by the master decision software program 72 from the service level agreement database 152, a fuzzy inference system 196 determines whether a request to add an engine blade 104 for the administrative group 52 will be made, or whether an offer to give up or remove an engine blade from the administrative group 52 will be made. The request to add or remove a blade is then communicated over communication channel 106 to the master decision software program 72. In one embodiment, the aggregator module 190 is executed on each server 46 within a given administrative group 52, and the predictor module 192 and fuzzy inference module 196 are executed on only a single server 46 within the given administrative group 52 with the outputs of the various measurement modules 180-184 been communicated to the designated server 46 across the communication channel 106. In another embodiment, the aggregator module 190, predictor module 192 and fuzzy inference module 196 may be executed on more than one server within a given administrative group for purposes of redundancy or distributed processing of the information necessary to generate the request add or remove a blade. Preferably, the aggregator module 190 accomplishes a balancing across the various measurement modules 180-184 in accordance with the formula:

Where $$T_{ki} \text{ is } B_k = \left[\left(\sum T_{ki}/w_k\right) - \min_k\right] * 100/(\max_k - \min_k) - 50$$

$$i = 1 \text{ to } w_k$$

the time take it for the ith request of measurement type k, $w_k$ is the window size for measurement type k, $\min_k$ is the minimum time expected for measurement type k, and $\max_k$ is the maximum time to be tolerated for a measurement type k. The balanced request rate $B_k$ is then passed to the predictor module 192 and the fuzzy inference module 196 of the local decision software program 70. The window size for the measurement type k would be set to minimize any unnecessary intrusion by the measurement modules 180-184, while at the same time allowing for a timely and adequate response to increases in usage demand for the administrative group 52.

Figure 16:
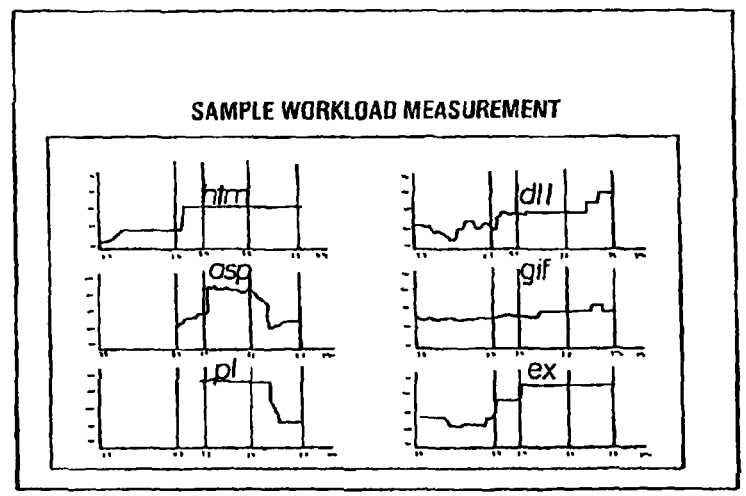
FIG. 16 is a graphic representation of the workload measurements from the various measurement modules of the local decision software program under varying load conditions.

FIG. 16 shows a sample of the workload measurements from the various measurement modules 180-184 under varying load conditions. It can be seen that no single workload measurements provides a constantly predictable estimate of the expected response time and probability for that response time. As such, the fuzzy inference module 196 must consider three fundamental parameters: the predicted response times for various requests, the priority these requests, and probability of their occurrence. The fuzzy inference module 196 blends all three of these considerations to make a determination as to whether to request a blade to be added or remove from the administrative group 52. An example of a fuzzy inference rule would be:

if (priority is urgent) and (probability is abundant) and (expected response time is too high) then (make request for additional blade).

Figure 17:
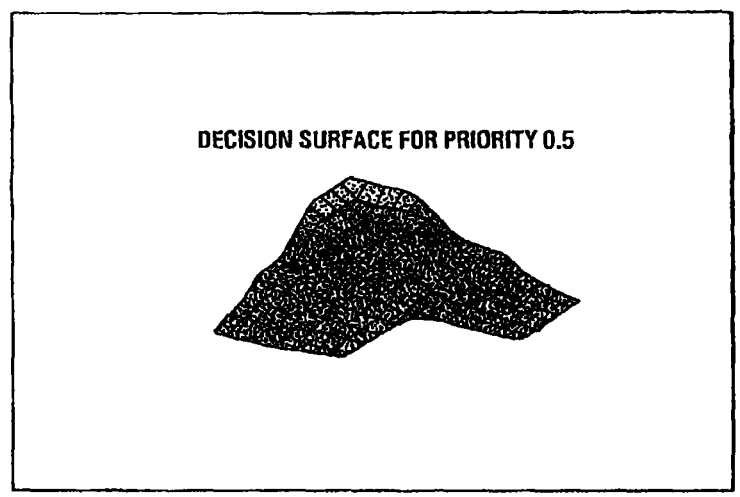
FIG. 17 is a graphic representation of a decision surface generated by the local decision software program to request or remove a server from an administrative group.

Preferably, the end results of the fuzzy inference module 196 is to generate a decision surface contouring the need to request an additional server over the grid of the expected response time vs. the probability of that response time for this administrative group 52. An example of such a decision surface is shown in FIG. 17.

A portion of the disclosure of this invention is subject to copyright protection. The copyright owner permits the facsimile reproduction of the disclosure of this invention as it appears in the Patent and Trademark Office files or records, but otherwise reserves all copyright rights.

Although the preferred embodiment of the automated system of the present invention has been described, it will be recognized that numerous changes and variations can be made and that the scope of the present invention is to be defined by the claims.

The invention claimed is:

1. A computer-implemented method for automatically allocating computing resources of a rack-and-blade computer assembly comprising:
receiving, by a computer system, server performance information from an application server pool disposed in a rack of said rack-and-blade computer assembly;
said application server pool comprising a blade server including an associated server agent for measuring performance of an application running on the blade server;
determining, by the computer system, at least one quality of service attribute for the application server pool;
determining, by the computer system, that the QoS attribute is below a standard;

allocating, by the computer system, a free blade server from a free server pool for use by the application server pool based on the determining by the computer system; and if the free server pool does not have an available blade server for allocation to the application server pool and based upon a request priority value of a resource request from the application, then allocating, by the computer system, a different blade server from a second application server pool in the rack to and for use by the application server pool if the application server pool has a first application server pool priority that is higher than a second application server pool priority that is associated with the second application server pool, so that the application runs on resources of the application server pool and of the different blade server allocated to the application server pool, wherein the first application server pool, the second application server pool, and the free server pool are each disposed in said rack of said rack-and-blade computer assembly.

2. The computer-implemented method of claim 1 additionally comprising selecting, by the computer system, prior to allocating for use, a blade server from a free server pool to obtain a selected blade server.

3. The computer-implemented method of claim 2 additionally comprising preparing, by the computer system, prior to allocating for use, the selected blade server for operation with the application server pool.

4. The computer-implemented method of claim 1 additionally comprising reconfiguring, by the computer system, a traffic management device associated with the application server pool.

5. The computer-implemented method of claim 1 additionally comprising provisioning, by the computer system, images onto at least one blade server of the application server pool.

6. The computer-implemented method of claim 1 additionally comprising monitoring, by the computer system, the performance of at least one blade server of the application server pool from information received by a server agent associated with the blade server.

7. The computer-implemented method of claim 1 additionally comprising removing, b the computer system, the use of at least one blade server from the application server pool.

8. The computer-implemented method of claim 7 additionally comprising disposing, by the computer system, the removed blade server in the free server pool.

9. The computer-implemented method of claim 1 additionally comprising determining, by the computer system, a relative performance of another application server pool.

10. The computer-implemented method of claim 9 additionally comprising identifying, by the computer system, at least one blade server from said another application server pool that would impact performance the least if reallocated to the application server pool.

11. A computer-implemented method for automatically allocating computing resources of a rack-and-blade computer assembly comprising:
receiving, by a computer system, server performance information from an application server pool disposed in a rack of said rack-and-blade computer assembly;
said application server pool comprising a blade server including an associated server agent for measuring performance of an application running on the blade server;
determining, by the computer system, at least one level of service for the application server pool;

determining, by the computer system, that the level of service is above a standard;
based upon a request priority value of a resource request from the application, removing, by the computer system, the use of the blade server from the application server pool and allocating the blade server for use by a second application server pool in the rack if the application server pool has a first application server pool priority that is lower than a second application server pool priority that is associated with the second application server pool, so that the application runs on resources of the second application server pool and of the blade server allocated to the second application server pool, wherein the application server pool and the second application server pool are each disposed in said rack of said rack-and-blade computer assembly.

12. The computer-implemented method of claim 11 additionally comprising allocating, by the computer system, the use of the removed blade server for use by a free server pool.

13. A computer-implemented method for automatically allocating computing resources of a rack-and-blade computer assembly comprising:
receiving, by a computer system, server performance information from an application server pool disposed in a rack of said rack-and-blade computer assembly;
said application server pool comprising a blade server including an associated server agent for measuring performance of an application running on the blade server;
determining, by the computer system, at least one level of service for the application server pool; determining that the level of service is below a standard;
determining, by the computer system, that no blade server in a free server pool is available for use; and
based upon a request priority value of a resource request from the application, selecting, by the computer system, a lower priority blade server in a second application server pool in the rack for use by the application server pool if the application server pool has a first application server pool priority that is higher than a second application server pool priority that is associated with the second application server pool, so that the application runs on resources of the application server pool and of the lower priority blade server allocated to the application server pool, wherein the application server pool, the second application server pool, and the free server pool are each disposed in said rack of said rack-and-blade computer assembly.

14. The computer-implemented method of claim 13 wherein said selecting, by the computer system, a lower priority blade server comprises selecting a lower priority blade server from the application server pool to obtain a selected blade server.

15. The computer-implemented method of claim 14 additionally comprising preparing, by the computer system, the selected blade server for operation with the application server pool.

16. The computer-implemented method of claim 15 additionally comprising flushing, by the computer system, the selected blade server.

17. The computer-implemented method of claim 13 additionally comprising reconfiguring, by the computer system, a traffic management device associated with the application server pool.

18. A computer-implemented method for automatically allocating servers and resources of a scalable computer engine comprising:

receiving, by a computer system, server performance measurements from an administrative group of servers disposed in a rack of said scalable computer engine;

said administrative group of servers comprising a blade server including an associated server manager for measuring performance of a service hosted on the blade server;

determining, by the computer system, at least one level of service for the administrative group of servers;

determining, by the computer system, that the level of service is below a standard;

allocating, by the computer system, a free blade server from a free pool of servers for use by the administrative group of servers based on the determining by the computer system; and if the free server pool does not have an available blade server for allocation to the application server pool and based upon a request priority value of a resource request from the application, then allocating, by the computer system a different blade server from a second application server pool in the rack to and for use by the administrative group of servers if the administrative group of servers has a first pool priority that is higher than a second pool priority that is associated with the second administrative group of servers, so that the service is hosted on resources of the administrative group of servers and of the different blade server allocated to the administrative group of servers, wherein the first administrative group of servers, the second administrative group of servers, and the free pool of servers are each disposed in said rack of said scalable computer engine.

19. A computer-implemented method for automatically allocating computing resources of a rack-and-blade computer assembly comprising:

receiving, by a computer system, server performance information from an application server pool disposed in a rack of said rack-and-blade computer assembly;

said application server pool comprising a blade server including an associated server agent for measuring performance of an application running on the blade server;

determining, by the computer system, at least one level of service for the application server pool; determining that the level of service is below a standard;

determining, b the computer system, that a free server pool has a free blade server available for use;

selecting, by the computer system, from the free server pool the available free blade server for use by the application server pool; and if the free server pool does not have the available free blade server and based upon a request priority value of a resource request from the application, then selecting, by the computer system, a different blade server from a second application server pool in the rack for use by the application server pool if the application server pool has a first application server pool priority that is higher than a second application server pool priority that is associated with the second application server pool, so that the application runs on resources of the application server pool and of the different blade server allocated to the application server pool, wherein the application server pool, the second application server pool, and the free server pool are each disposed in said rack of said rack-and-blade computer assembly.

20. The computer-implemented method of claim 19 additionally comprising installing, by the computer system, software on the selected available blade server.

21. The computer-implemented method of claim 20 additionally comprising configuring, by the computer system, the selected available blade server.

22. The computer-implemented method of claim 19 additionally comprising readying, by the computer system, the selected available blade server for operation.

23. The computer-implemented method of claim 19 additionally comprising reconfiguring, by the computer system, a traffic management device associated with the application server pool.

24. An article of manufacture comprising:

a machine-readable, non-transitory medium having stored thereon instructions for:

receiving server performance information from an application server pool disposed in a rack of a rack-and-blade computer assembly;

said application server pool comprising a blade server including an associated server agent for measuring performance of an application running on the blade server;

determining at least one level of service for the application server pool; determining that the level of service is above a standard;

based upon a request priority value of a resource request from the application, removing the use of the blade server from the application server pool and allocating the blade server for use by a second application server pool in the rack if the application server pool has a first application server pool priority that is lower than a second application server pool priority that is associated with the second application server pool, so that the application runs on resources of the second application server pool and of the blade server allocated to the second application server pool, wherein the application server pool and the second application server pool are each disposed in said rack of said rack-and-blade computer assembly.

* * * * *